United States Patent
Komura et al.

(10) Patent No.: US 8,264,919 B2
(45) Date of Patent: Sep. 11, 2012

(54) THERMAL ASSISTED MAGNETIC RECORDING HEAD HAVING SPOT SIZE CONVERTER

(75) Inventors: Eiji Komura, Tokyo (JP); Tsutomu Chou, Tokyo (JP); Koji Shimazawa, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 357 days.

(21) Appl. No.: 12/659,094

(22) Filed: Feb. 25, 2010

(65) Prior Publication Data

US 2011/0205660 A1    Aug. 25, 2011

(51) Int. Cl.
   *G11B 11/00*    (2006.01)
(52) U.S. Cl. .................. 369/13.33; 369/13.13
(58) Field of Classification Search .......... 369/13.33, 369/13.13, 13.32, 13.02, 112.09, 112.14, 369/112.21, 112.27; 360/59; 385/129, 31, 385/88–94; 29/603.01–603.27; 259/201.3, 259/201.5
See application file for complete search history.

(56) References Cited

U.S. PATENT DOCUMENTS

| | | | |
|---|---|---|---|
| 4,773,720 A | 9/1988 | Hammer | |
| 6,768,556 B1 | 7/2004 | Matsumoto et al. | |
| 7,221,826 B2 | 5/2007 | Hanashima et al. | |
| 7,330,404 B2 | 2/2008 | Peng et al. | |
| 8,098,547 B2 * | 1/2012 | Komura et al. | 369/13.33 |
| 8,149,654 B2 * | 4/2012 | Komura et al. | 369/13.33 |
| 2003/0066944 A1 | 4/2003 | Matsumoto et al. | |
| 2004/0081031 A1 | 4/2004 | Saga et al. | |
| 2007/0230288 A1 * | 10/2007 | Nishida et al. | 369/13.13 |
| 2008/0151431 A1 | 6/2008 | Tanaka et al. | |
| 2009/0303858 A1 * | 12/2009 | Kuiseko et al. | 369/13.33 |
| 2011/0170381 A1 * | 7/2011 | Matsumoto | 369/13.33 |
| 2012/0075966 A1 * | 3/2012 | Tomikawa et al. | 369/13.33 |
| 2012/0082016 A1 * | 4/2012 | Komura et al. | 369/13.33 |

OTHER PUBLICATIONS

"Optical Technologies and Applications," *Intel Technology Journal*, vol. 8, Issue 2, pp. 153-156, May 10, 2004.

T. Shoji, et al., "Low loss mode size converter from 0.3 μm square Si wire waveguides to singlemode fibres," *Electronics Letters*, vol. 38, No. 25, pp. 1669-1670, Dec. 5, 2002.

* cited by examiner

*Primary Examiner* — Tan X Dinh
(74) *Attorney, Agent, or Firm* — Posz Law Group, PLC

(57) ABSTRACT

A spot size converter according to the present invention is capable of shortening the waveguide length in the spot size converter and of promoting a size reduction of the optical waveguide itself because two cores having a taper portion are combined and those tapering angles are mutually aligned. Furthermore, spot size conversion efficiency is favorable even in a small size.

10 Claims, 18 Drawing Sheets

THERMAL ASSISTED MAGNETIC RECORDING HEAD HAVING SPOT SIZE CONVERTER

BACKGROUND OF THE INVENTION

1. Field of the Invention

The present invention relates to a spot size converter and thermal assist magnetic recording head (or thermally-assisted magnetic recording head) that uses same.

2. Description of Related Art

Further improvement to thin film magnetic heads and magnetic recording media is in demand in conjunction with the promotion of high recording density in magnetic disk devices in the field of magnetic recording using a head and medium. At the present time, composite type thin film magnetic heads, comprising a structure where a magnetoresistive (MR) element for reading and an electromagnetic conversion element for writing are laminated, are widely used as thin film magnetic heads.

Meanwhile, a magnetic recording medium is a so-called discontinuous body on which magnetic microparticles aggregate, and each of the magnetic microparticles is a single magnetic domain structure. Here, a single recording bit is configured from a plurality of magnetic microparticles. Accordingly, in order to increase the recording density, unevenness of the recording bit boundary must be reduced by reducing the size of the magnetic microparticles. However, reducing the size of the magnetic microparticles produces the problem of a reduction in the thermal stability of magnetization that accompanies volume reduction.

Increasing the magnetic anisotropy energy Ku of the magnetic microparticles can be considered as a countermeasure for such a problem. However, an increase in Ku causes an increase in the anisotropic magnetic field (coercive force) of the magnetic recording medium. In this regard, the upper limit of the write magnetic field intensity by the thin film magnetic head is nearly determined by the saturation magnetic flux density of the soft magnetic material that constitutes the magnetic core within the head. Accordingly, writing becomes impossible when the anisotropy magnetic field of the magnetic recording medium exceeds the tolerance determined from the upper limit of the write magnetic field intensity. Currently, one method to resolve the problem of this type of thermal stability proposes a so-called thermally-assisted magnetic recording method in which writing is performed by reducing the anisotropy magnetic field through adding heat to the magnetic recording medium immediately prior to applying the write magnetic field while using a magnetic material with a large Ku.

A commonly known method for such thermally-assisted magnetic recording uses a near-field probe, a so-called plasmon antenna, that is a piece of metal that generates a near-field from plasmon excited by an irradiated laser beam. For example, a plasmon antenna is disclosed in the specification of U.S. Pat. No. 6,768,556 that provides a cone shaped metal scatterer formed on a substrate, and a film, which is dielectric or the like, formed around the periphery of the scatterer.

Further, a configuration is disclosed in U.S. Patent Publication No. 2004/081031 A1 that forms a plasmon antenna in a position to contact the main magnetic pole of a perpendicular magnetic recording head so that the irradiated surface is perpendicular to the magnetic recording medium. Furthermore, technology is disclosed in U.S. Patent Publication No. 2003/066944 A1 that attempts irradiation of a stronger near-field onto the magnetic recording medium by making a priority for the tip of the plasmon antenna to be closer to the magnetic recording medium.

The inventors of the present application are proceeding with the development of a further improved thermally-assisted magnetic recording head by using near-field irradiation in pursuit of the limit of magnetic recording potential.

When performing thermally-assisted recording with a magnetic recording head using irradiation of a near-field, a laser generating device is mounted on the magnetic recording head as a light emitting element, and the laser light emitted from the laser generating device is introduced into an optical waveguide and requires guidance to the plasmon antenna which exists in a position in close proximity facing the magnetic recording medium.

A spot size converter is used at such time to effectively taper the spot size of the laser light entering the optical waveguide. The spot size converter, from a perspective of by tapering propagating light, performs essentially the same action as an optical waveguide.

However, the size of the magnetic recording head itself is extremely small, so that a design that reduces the size by shortening the waveguide length to effectively taper light so as to be suitable for use in such a corresponding size is desired to provide a spot size converter with favorable spot size conversion efficiency even with a reduced size.

SUMMARY OF THE INVENTION

In order to solve the aforementioned problem, the spot size converter of the present invention, including: a second core that operates to introduce a light beam and to taper light from the light beam, a first core that is linked to the second core, and a clad that surrounds a periphery of a core coupling body formed by linking the first and second cores, wherein when the refractive index of the second core is $n_{C2}$, the refractive index of the first core is $n_{C1}$, and the refractive index of the clad is $n_{ad}$, the condition of $n_{C1} > n_{C2} > n_{ad}$ is satisfied; the second core has a rectangular cross-sectional area that gradually decreases as the second core advances internally from the optical incident end surface, and that has a taper portion that is a triangular plate-like part when viewed from a level plane; the first core has a tapered coupling part that is integrated within the taper portion of the second core, and a waveguide core part that is linked with the tapered coupling part and that propagates primarily in a single mode, and the tapered coupling part is structured such that its shape viewed from a level plane is a triangular plate-like coupling part, and the level plane in which the rectangular cross-sectional area gradually increases in relation to an advancing direction of the light.

A more preferable embodiment of the spot size converter of the present invention is structured so that one surface of the triangular plate-like coupling part of the first core contacts the taper portion of the second core; the other surface of the triangular plate-like coupling part of the first core contacts the clad; both side surfaces of the triangular plate-like coupling part of the first core contact the taper portion of the second core; and the periphery of the waveguide core part of the first core is substantially surrounded by the clad.

A more preferable embodiment of the spot size converter of the present invention is structured so that conditions L2/L1=0.7~1.3, and θ/θ1=0.005~1847 are satisfied when an effective coupling length of the taper portion of the second core is L2, a tapering angle is θ2, a length of the tapered coupling part of the first core is L1, and a spread angle is θ1.

A more preferable embodiment of the spot size converter of the present invention is structured so that conditions L2=55~450 µm and θ2=0.026~16.26 deg. are satisfied.

A more preferable embodiment of the spot size converter of the present invention is structured so that a value of the second core refractive index $n_{C2}$ is within a range of 1.46~2.00, a value of the first core refractive index $n_{C1}$ is within a range of 1.7~3.4, a value of the clad refractive index $n_{ad}$ is within a range of 1.4~1.80, and a condition of $n_{C1} > n_{C2} > n_{ad}$ is satisfied.

A more preferable embodiment of the spot size converter of the present invention is structured so that a material of the second core is SiON, a material of the first core is TaOx, and a clad material is $Al_2O_3$.

A more preferable embodiment of the spot size converter of the present invention is structured so that an end of a width line in a linked area of the tapered coupling part in the first core and the waveguide core part linked to the tapered coupling part exists in a same position that matches with a tapering line of the taper portion of the second core.

A more preferable mode of the spot size converter of the present invention is structured so that an end of a width line in a linked area of the tapered coupling part in the first core and the waveguide core part linked to the tapered coupling part exists inside a tapering line of the taper portion of the second core.

A more preferable mode of the spot size converter of the present invention is structured so that an end of a width line in a linked area of the tapered coupling part in the first core and the waveguide core part linked to the tapered coupling part exists outside a tapering line of the taper portion of the second core.

The thermally-assisted magnetic recording head of the present invention is structured to include; a magnetic pole that generates a writing magnetic field from an end surface on an air bearing surface side, a spot size converter that propagates light for exciting surface plasmon, and a plasmon-generator that is a part that couples with the light in a surface plasmon mode.

The spot size converter according to the present invention is capable of shortening the waveguide length in the spot size converter and promoting a size reduction of the optical waveguide itself because two cores are combined and those tapering angles are mutually aligned. Furthermore, spot size conversion efficiency is favorable even in a small size.

DETAILED DESCRIPTION OF THE INVENTION

A detailed description is given hereafter of the best mode to implement the present invention.

Figure 1:
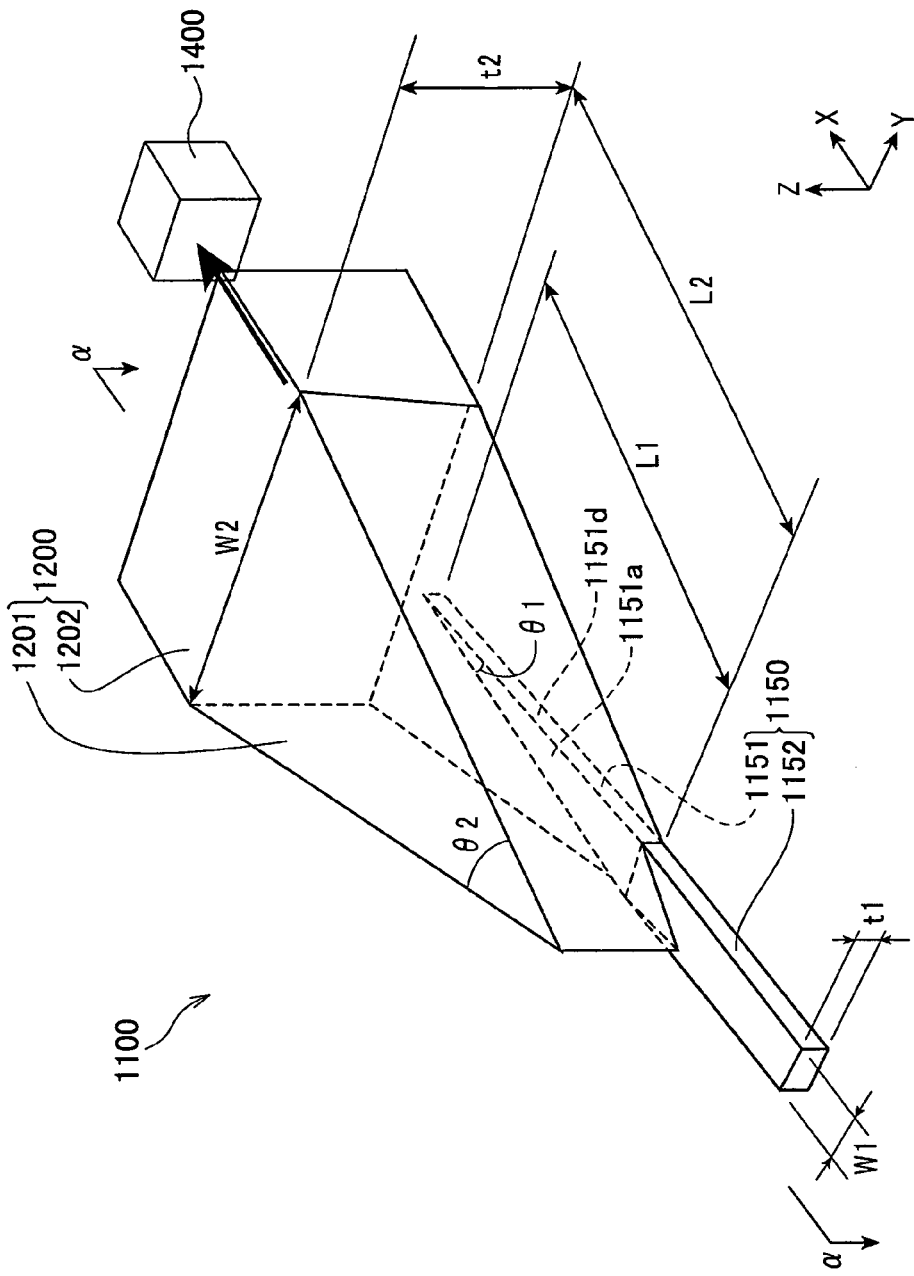
FIG. 1 is a diagrammatic perspective view depicting, without a clad, a spot size converter structure of the present invention in order to taper a beam by introducing a light beam emitted from a light emitting element.

FIG. 1 is, for example, a perspective view diagrammatically depicting the spot size converter 1100 for propagating and tapering (tapering primarily to a single mode level) a beam together with introducing a light beam generated from a light emitting element such as the laser diode 1400. Moreover, this drawing illustrates a state in which the portion of the clad 1300 is removed in order to demonstrate the essential component structure.

Figure 2:
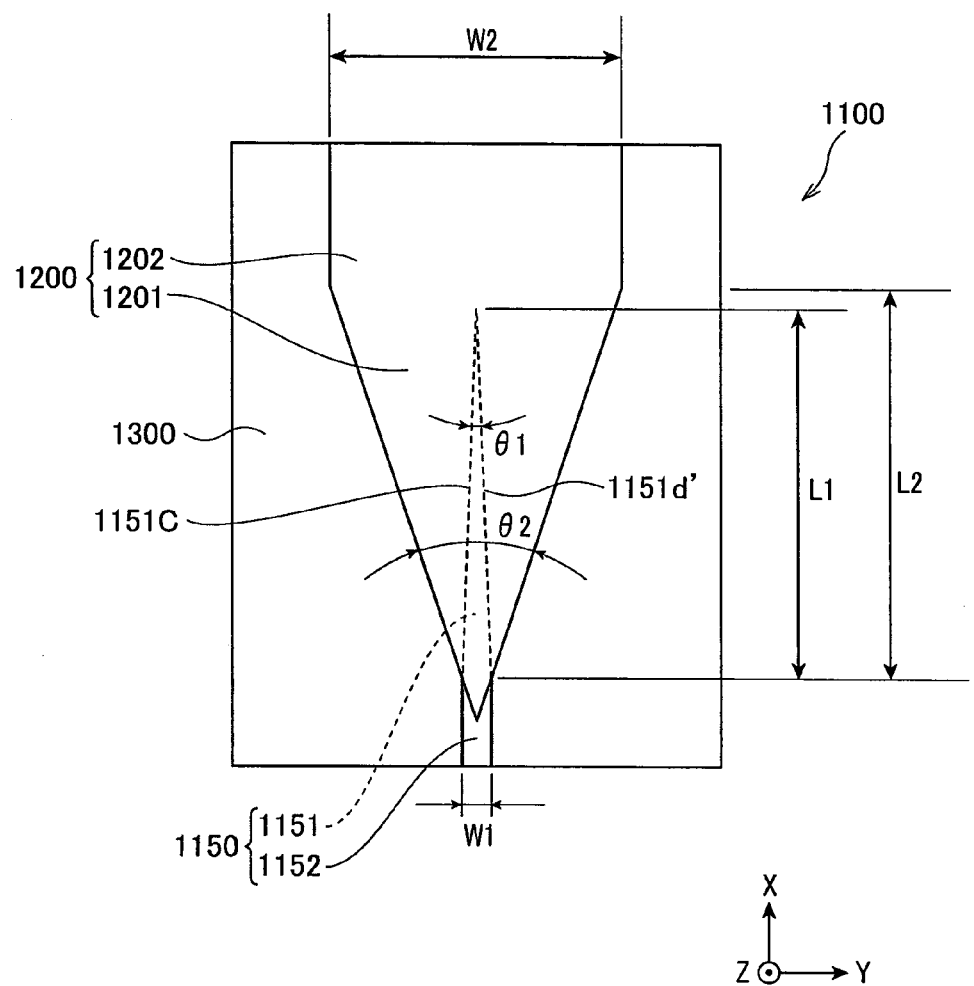
FIG. 2 is a plan view of a spot size converter illustrated in FIG. 1 with the clad depicted, and the clad is depicted to enable transparent viewing.

FIG. 2 is a plan view drawing of the spot the size converter 1100 illustrated in FIG. 1, and the clad 1300 is depicted for transparent viewing in order to demonstrate the essential component structure of that where the clad 1300 exists.

Figure 3:
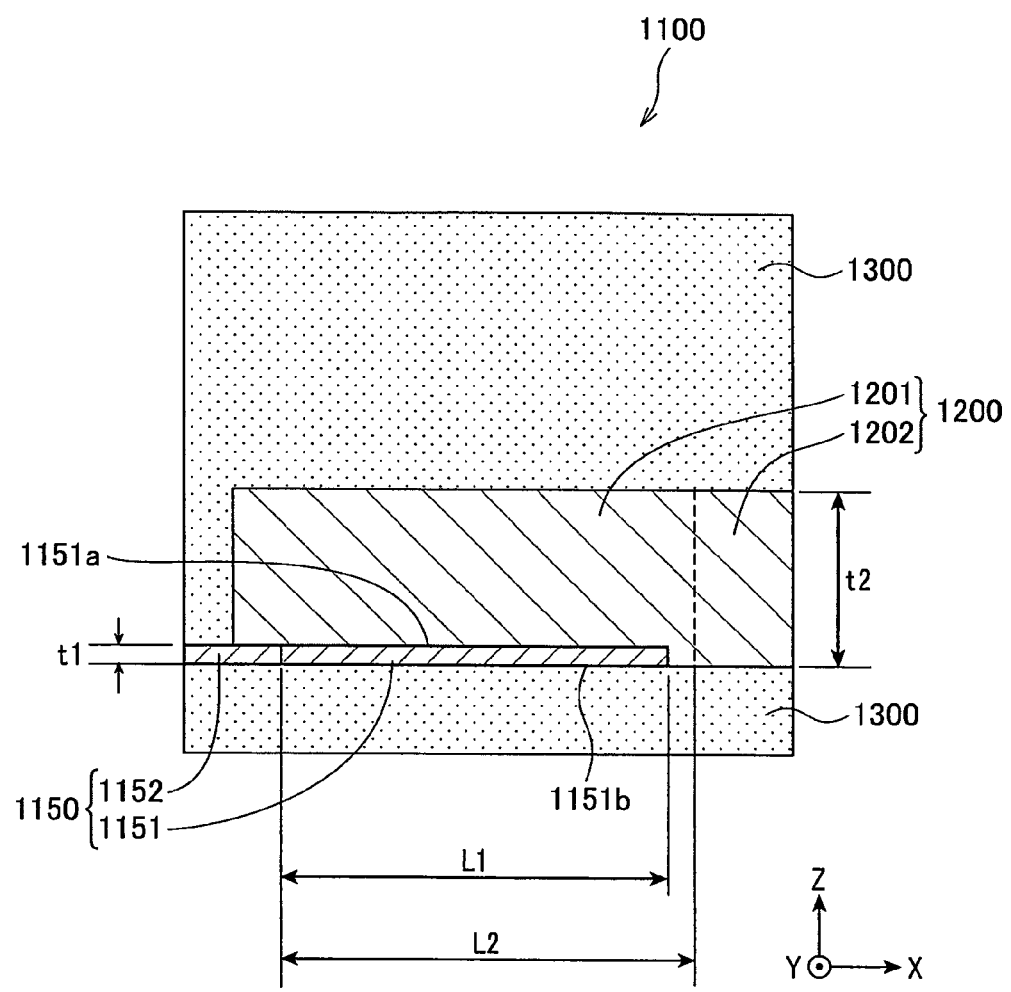
FIG. 3 is a cross-sectional view cut along α-α that corresponds to the centerline of the spot size converter illustrated in FIG. 1.

FIG. 3 is a cross-sectional view cut along α-α that corresponds to the centerline of the spot size converter 1100 illustrated in FIG. 1.

As illustrated in FIG. 1~FIG. 3, the spot size converter 1100 of the present invention is structured to have a second core 1200 having an operation to taper light by directly introducing a light beam, a first core 1150 linked to the second core 1200, and a clad 1300 (see FIG. 2 and FIG. 3) that covers the periphery of the core coupling body formed by linking the first and second cores 1150 and 1200.

With this type of spot size converter 1100 of the present invention, each material is selected for the first and second core and the clad in order to satisfy the condition of $n_{C1} > n_{C2} > n_{ad}$ when the refractive index of the second core 1200 is $n_{C2}$, the refractive index of the first core 1150 is $n_{C1}$, and the refractive index of the clad 1300 is $n_{ad}$.

With the spot size converter of the present invention, the second core 1200 provides a plate-like taper portion 1201 of which a rectangular cross-sectional area gradually decreases when advancing internally from an optical incident plane end surface, and that has a triangular shape when viewed from a level plane (or X-Y plane). With the embodiment illustrated in FIG. 1~FIG. 3, the rectangular solid shaped introduction waveguide 1202 is continuously and integrally formed from the optical incident plane end surface until reaching the taper portion 1201; however, the introduction waveguide 1202 can be omitted. That is to say, another embodiment can be made in which the triangular (specifically an isosceles triangle) plate-like taper portion 1201 begins directly from the optical incident plane end surface.

Width W2 that corresponds to the bottom edge of the triangle of the taper portion 1201, as illustrated in FIG. 1, is between 0.3 and 10 μm, more preferably between 1 and 4 μm. The thickness t2 is between 0.1 and 5 μm, more preferably between 0.3 and 3 μm.

The first core 1150 linked with the second core 1200 in this manner includes the tapered coupling part 1151 that is integrated as a single unit within the taper portion 1201 of the second core 1200, and a waveguide core part 1152 for propagating in primarily a single mode by linking with the tapered coupling part 1151.

The tapered coupling part 1151 of the first core 1150 is formed as the plate-like coupling part 1151 of which a rectangular cross-sectional area gradually increases with respect to the advancing direction of the light. The tapered coupling part 1151 has an elongated triangular shape (especially an isosceles triangle) when viewed from a level plane (or X-Y plane) (hereinafter as a triangular plate-like coupling part 1151).

The plane 1151a (see FIG. 1 and FIG. 3) of one side of the triangular plate-like coupling part 1151 of the first core 1150 in this manner contacts the taper portion 1201 of the second core. The plane 1151b (see FIG. 3) of the other side of the triangular plate-like coupling part 1151 of the first core 1151 positioned on the opposing side to that side contacts the clad 1300.

Further, both side surfaces 1151c and 1151d of the triangular plate-like coupling part 1151 of the first core 1150 contact the taper portion 1201 of the second core (see FIG. 1 and FIG. 2).

The periphery of the waveguide core part 1152 that contacts the triangular plate-like coupling part 1151 of the first core 1150 in this manner is essentially surrounded by the clad. The use of "essentially" means, as illustrated in FIG. 1, to include where a small portion of the tip of the triangular plate-like taper portion 1201 is covered. The width W of the waveguide core part 1152 as illustrated in FIG. 1 is between 0.1 and 3 μm, more preferably between 0.2 and 1 μm. The thickness t1 is between 0.1 and 2 μm, more preferably between 0.2 and 1 μm.

With the relationship between the core coupling body in which the first core 1150 and the second core 1200 are linked, as illustrated in FIG. 1 and FIG. 2, when the effective coupling length of the taper portion 1201 of the second core 1200 is L2, the tapering angle thereof is θ2, the length of the tapered coupling part 1151 of the first core 1150 is L1, and the spread angle thereof is θ1, then L2/L1=0.7~1.3 and more preferably between 0.85 and 1.15 and most preferably between 0.95 and 1.05, and θ2/θ1=0.005~1847 and more preferably between 0.016 and 601.

When the value of L2/L1 is less than 0.7, the problem arises in that there is a tendency for the propagative efficiency to be reduced since the effect of coupling both parts in a tapered shape diminishes.

Conversely, when the value of L2/L1 exceeds 1.3, similarly as with the case above, the problem arises in that there is a tendency for the propagative efficiency to be reduced as the effect of coupling the both parts in a taper shape diminishes.

The above value of L2 is set as L2=55~450 and preferably between 55 and 300 μm and more preferably between 55 and 230 μm. With the present invention, in comparison to a comparative example in which only one side is tapered and coupled, the benefit of the propagative efficiency is confirmed even with an extremely short distance of between 55 and 100 μm.

Moreover, the effective coupling length L2 of the taper portion 1201 is defined as the distance from the position of the bottom edge of the triangular taper portion 1201 until the position in which the side surface of the taper portion 1201 joins with the first core 1150.

The value of the θ2 is set, θ2=0.026~16.26 deg., and preferably between 0.057 and 11.40 deg. Further, the value of θ1 is set, θ1=0.0088~4.90 deg., and preferably between 0.019 and 3.42 deg.

In addition, the value of the refractive index $n_{C2}$ of the second core is a range of between 1.46 and 2.00, the value of the refractive index $n_{C1}$ of the first core is a range of between 1.7 and 3.4, and the refractive index $n_{ad}$ of the clad is a range of between 1.45 and 1.80, and is configured so as to satisfy the condition $n_{C1} > n_{C2} > n_{ad}$.

If the condition of these refractive indices is not satisfied, the problem occurs in which as a result tapering of the propagating light is not executed with the coupled portion of the second core and first core.

For instance, SiON, SiO, AlON, MgO, and the like, can be used as material for the second core, while TaOx, SiON, AlON, ZrO, TiO, Si, and the like, can be used as material for the first core, and $Al_2O_3$, $SiO_2$, MgO, SiON, AlON, and the like can be used as material for the clad.

The following favorable combinations exist as specific combinations for these materials:

| | | |
|---|---|---|
| (1) | Second core material: | SiON |
| | First core material: | TaOx |
| | Clad material: | $Al_2O_3$ |
| (2) | Second core material: | $Al_2O_3$ |
| | First core material: | TaOx |
| | Clad material: | $SiO_2$ |
| (3) | Second core material: | SiON |
| | First core material: | Si |
| | Clad material: | $SiO_2$ |

| (4) | Second core material: | SiON |
|---|---|---|
|  | First core material: | ZrO |
|  | Clad material: | $Al_2O_3$ |

Figure 4:
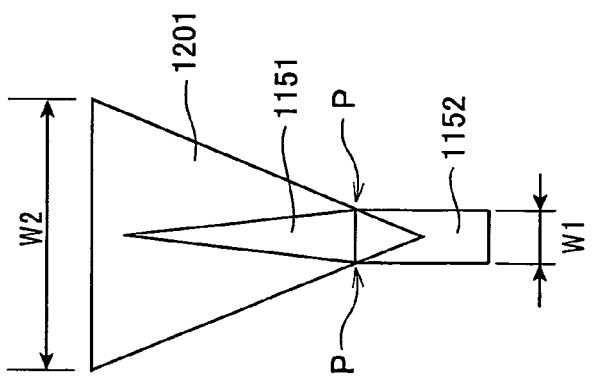
FIG. 4 is a diagrammatic plan view transparently illustrating a state in which the end of the width line in the link site of the tapered coupling part and the waveguide core part in the first core exist in a position which matches by a relationship with the tapering line of the taper portion of the second core.

With the embodiment of the core coupling body in which the first and second cores 1150 and 1200 are linked in the spot size converter illustrated in FIG. 1~FIG. 3, the end P of the width line in the linked area of the waveguide core part 1152 and the tapered coupling part 1151 in the first core, exists in a matching position due to the relationship with the tapering line (the side surface of the taper portion 1201) of the taper portion 1201 of the second core as illustrated in FIG. 4.

Figure 5B:
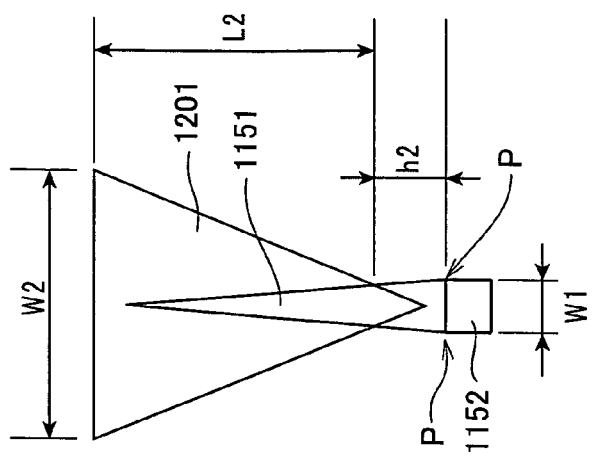
FIG. 5B is a diagrammatic plan view transparently illustrating a state in which the end of the width line in the link site of the tapered coupling part and the waveguide core part in the first core exists further to the outside the than the tapering line of the taper portion of the second core by a relationship with the tapering line of the taper portion of the second core.
Figure 5A:
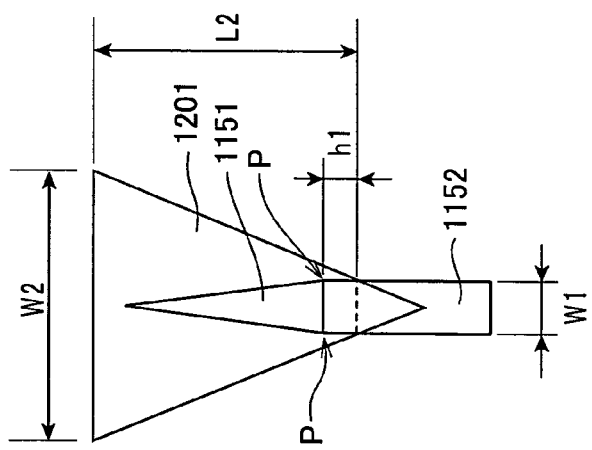
FIG. 5A is a diagrammatic plan view transparently illustrating a state in which the end of the width line in the link site of the tapered coupling part and the waveguide core part in the first core exists further to the inside than the tapering line of the taper portion of the second core by a relationship with the tapering line of the taper portion of the second core.

Further, as a modified example of the embodiment, the end P of the width line in the linked area of the waveguide core part 1152 and the tapered coupling part 1151 in the first core may also exist farther to the inside than the tapering line of the taper portion 1201 of the second core on account of the relationship with the tapering line (the side surface of the taper portion) of the taper portion 1201 of the second core as illustrated in FIG. 5A. However, the distance h1 in this case from the end P to the position in which the waveguide core part 1152 joins with the tapering line of the taper portion 1201 of the second core is preferably within a range of 0~150 μm.

Further, as a modified example of the embodiment of FIG. 4, the end P of the width line in the linked area of the waveguide core part 1152 and the tapered coupling part 1151 in the first core may also exist farther to the outside than the tapering line of the taper portion 1201 of the second core due to the relationship with the tapering line (the side surface of the taper portion) of the taper portion 1201 of the second core as illustrated in FIG. 5B. However, the distance h2 in this case from the end P to the position in which the tapered coupling part 1151 joins with the tapering line of the taper portion 1201 of the second core is preferably within a range of 0~150 μm.

Next, a description is given of the preferred example of the thermally-assisted magnetic recording head in which the spot size converter 1100 of the present invention described above is favorably applied as an optical waveguide. However, the structure is not limited to only the thermally-assisted magnetic recording head in the following description.

(Description of Thermally-Assisted Magnetic Recording Head)

Prior to describing the thermally-assisted magnetic recording head, definitions of the terms used in the present specification will be given. For the layered structure or element structure formed on the element formation surface of the slider substrate of the magnetic recording head, when viewed from the standard layer or element, the substrate side is "down (downward)," and the opposite side thereof is "up (upward)." Further, "X, Y, and Z directions" are designated in the drawings as necessary for the embodiment of the magnetic head. Here, the Z direction corresponds to the aforementioned up and down directions, the +Z side corresponds to the trailing side, and the −Z side corresponds to the reading side. The Y direction is the track width direction, and the X direction is the height direction. Further, the "side surface" of the waveguide provided within the corresponding magnetic head in the description of the magnetic recording head indicates an end surface other than an end surface orthogonal to the propagation direction (−X direction) of the light which propagates in the waveguide from the end surfaces which surround the waveguide. Therefore, the "upper surface" and "lower surface" of the waveguide are also the "side surface" in the description of the magnetic recording head, and the "side surface" is the plane which enables complete reflection of propagated light within the waveguide that corresponds to the core.

Figure 6:
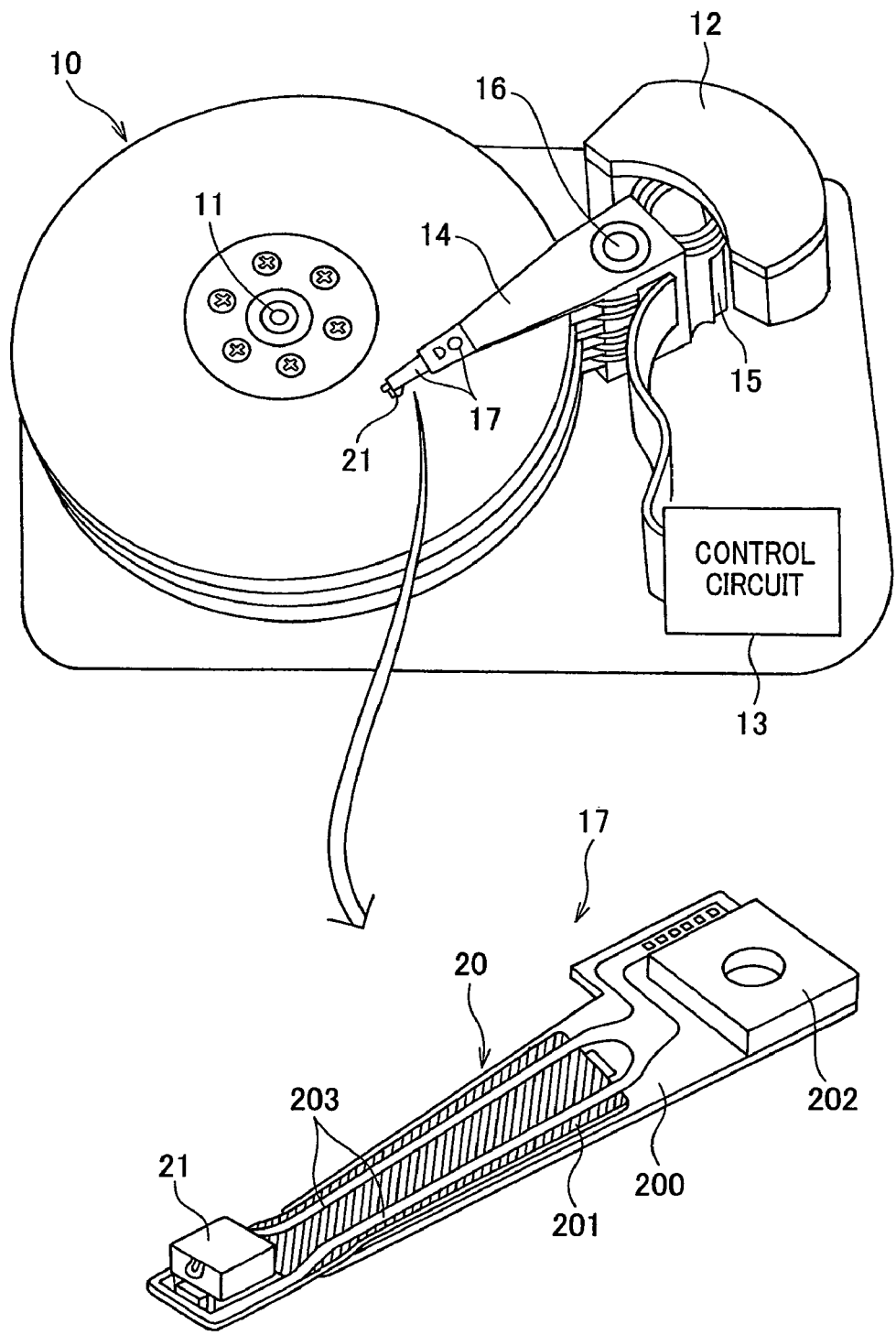
FIG. 6 is a perspective view schematically illustrating a structure of essential components of one embodiment of a head gimbal assembly (HGA) and a magnetic recording device with the ability to suitably apply the optical waveguide of the present invention.

FIG. 6 is a perspective view schematically illustrating the structure of the essential components in one embodiment of the magnetic recording device and HGA (head gimbal assembly). Here, the perspective view of the HGA illustrates up as the side facing the magnetic recording medium surface of the HGA.

The magnetic disk device, as the magnetic recording device indicated in FIG. 6, rotates around the rotational axis of the spindle motor 11, and provides a plurality of magnetic disks 10 as the magnetic recording medium, an assembly carriage device 12 that provides a plurality of drive arms 14, a head gimbal assembly (HGA) 17 that provides a thermally-assisted magnetic recording head 21 that is a thin film magnetic head attached to the tip of each drive arm 14, and a record reproduction and light emission control circuit 13 that controls the writing and reading operation of the thermally-assisted magnetic recording head 21, and that is for controlling the light emission operation of the laser diode which is the light source to generate the laser light for use in the thermally-assisted magnetic recording to be described hereafter.

The magnetic disk 10, in the present embodiment, is for perpendicular magnetic recording, and has a structure in which a soft magnetic under layer, an interim layer, and a magnetic recording layer (perpendicular magnetized layer) are layered in that order onto the disk substrate. The assembly carriage device 12 is a device for determining the position of the thermally-assisted magnetic recording head 21 on the track aligned with recording bits formed in the magnetic recording layer of the magnetic disk 10. Within the assembly carriage device 12, the drive arms 14 are stacked in a direction along the pivot bearing axis 16 and are configured with the ability for angular swing centrally around the axis 16 by a voice coil motor (VCM) 15.

Moreover, the structure of the magnetic disk device that relates to the present invention is not limited to the structure described above. For example, the magnetic disk 10, drive arms 14, HGA 17, and thermally-assisted magnetic recording head 21, may also be a unit.

In addition, according to FIG. 6, with the HGA 17, the suspension 20 is structured to provide a load beam 200, a flexure 201 that is fixed to the load beam 200 having elasticity, and a base plate 202 prepared at the base of the load beam 200. Further, above the flexure 201, a wiring member 203 is provided and is configured with a connection pad electrically connected to the lead conductive body and both ends thereof. The thermally-assisted magnetic recording head 21 is at the tip end portion of the suspension 20 and is fixed to the flexure 201 so as to face the surface of each magnetic disk 10 at a predetermined spacing (flying height). In addition, one end of the wiring member 203 is electrically connected to the terminal electrode of the thermally-assisted magnetic recording head 21.

Moreover, the structure of the suspension 20 also is not limited to the structure described above. An IC chip for driving the head, although not illustrated in the drawing, may also be mounted midway on the suspension 20.

Figure 7:
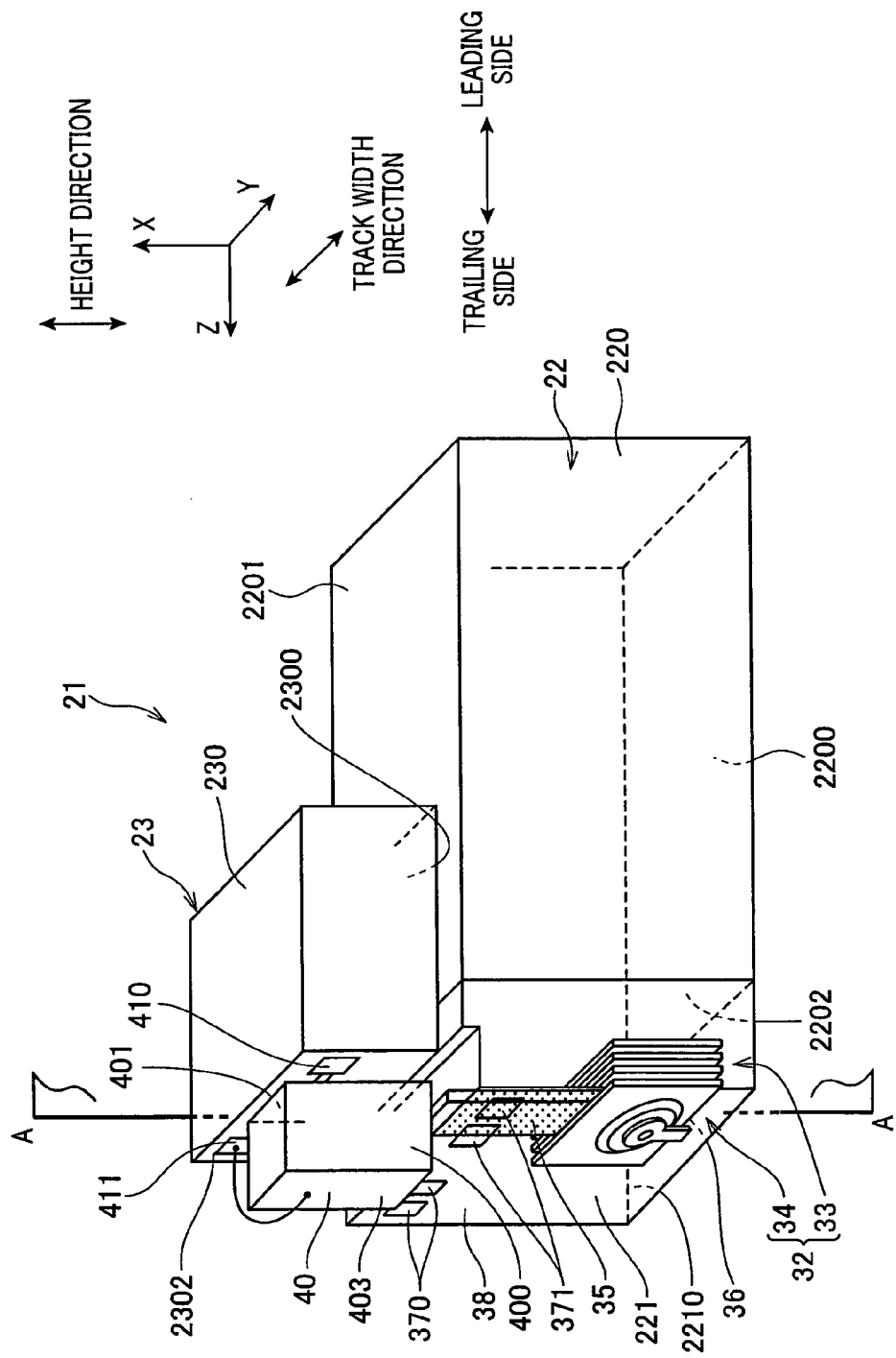
FIG. 7 is a perspective view schematically illustrating a structure of essential components of a thermally-assisted magnetic recording head with the ability to suitably apply the optical waveguide of the present invention.

FIG. 7 is a perspective view illustrating one embodiment of the thermally-assisted magnetic recording head 21 according to the present invention.

The thermally-assisted magnetic recording head 21, as illustrated in FIG. 7, provides a slider 22 and a light source unit 23.

The slider 22 is formed from AlTiC (Al$_2$O$_3$—TiC) or the like, and provides a slider substrate 220 having an air bearing surface (ABS) 2200 that is a medium opposing surface processed to obtain the appropriate flying height, and a head unit 221 formed on the element forming surface 2202 orthogonal to the ABS 2200.

Further, the light source unit 23 provides a unit substrate 230 having an adhesion surface 2300 and is formed from AlTiC (Al$_2$O$_3$—TiC) or the like, and a laser diode 40 as the light source prepared at a light source joining surface 2302 orthogonal to the adhesion surface 2300. Here, the slider 22 and the light source unit 23 are mutually joined together by bonding the rear surface 2201 of the slider substrate 220 with the adhesion surface 2300 of the unit substrate 230.

Here, the rear surface 2201 of the slider substrate 220 is the end surface of the opposing side to the ABS 2200 of the slider substrate 220. Moreover, the thermally-assisted magnetic recording head 21 may also be formed by directly mounting the laser diode 40 to the slider 22 without using the light source unit 23.

The head unit 221 formed on the element formation surface 2202 of the slider substrate 220 of the slider 22 provides a head element 32, a waveguide 35, a surface plasmon-generator 36, an overcoat layer 38, a pair of terminal electrodes 370, and a pair of terminal electrodes 371. Herein, the head element 32 is structured by providing both the MR element 33 for reading data from the magnetic disk and the electromagnetic conversion element 34 for writing data to the magnetic disk. The waveguide 35 is configured to guide laser light from the laser diode 40 provided by the light source unit 23 to the air bearing surface side. The surface plasmon-generator 36 is configured by the waveguide 35 together with the near-field generator. The overcoat layer 38 is formed on the element formation surface 2202 so as to cover the MR element 33, the electromagnetic conversion element 34, the waveguide 35, and the surface plasmon-generator 36. The pair of the terminal electrodes 370 is electrically connected to the MR element 33 and is exposed to the upper surface of the overcoat layer 38. The pair of the terminal electrodes 371 is electrically connected to the electromagnetic conversion element 34 and is exposed to the upper surface of the overcoat layer 38 in the same manner. Here, the waveguide 35 provides the same structure as the spot size converter 1100 described by using FIG. 1~FIG. 4 above and is synonymous. The waveguide 35 may not depict the same embodiment as the spot converter illustrated in FIG. 1~FIG. 4, but it is the same.

The terminal electrodes 370 and 371 are electrically connected to the connection pad of the wiring member 203 prepared at the flexure 201 (see FIG. 6).

The MR element 33 and one end of the electromagnetic conversion element 34 as well as the surface plasmon-generator 36 reaches to the head end surface 2210 that is the medium opposing surface of the head unit 221. Here, the head end surface 2210 and the ABS 2200 make up the medium opposing surface of the entire thermally-assisted magnetic recording head 21.

At the time of actual writing or reading, the thermally-assisted magnetic recording head 21 hydro-dynamically flies with a predetermined flying height above the rotating magnetic disk surface. At such time, the ends of the MR element 33 and the electromagnetic conversion element 34 face each other through an appropriate magnetic spacing with the surface of the magnetic recording layer of the magnetic disk.

In this state, the MR element 33 performs reading by sensing the data signal magnetic field from the magnetic recording layer, and the electromagnetic conversion element 34 performs writing by applying a data signal magnetic field to the magnetic recording layer. Here, at the time of writing, the laser light propagated via the waveguide 35 from the laser diode 40 of the light source unit 23, as will be described hereafter, couples with the surface plasmon-generator 36 in the surface plasmon mode and excites the surface plasmon to the surface plasmon-generator 36.

This surface plasmon propagates the propagative edge equipped on the surface plasmon-generator 36 to be described hereafter, toward the head end surface 221, and a near-field is generated at the end of the head end surface side 221 of the surface plasmon-generator 36. This near-field reaches the magnetic disk surface heating the magnetic recording layer portion of the magnetic disk, and thereby lowering anisotropy magnetic field (coercive force) of such portion to a certain level for enabling a writing process. As a result, thermally-assisted magnetic recording is able to be performed.

Figure 8:
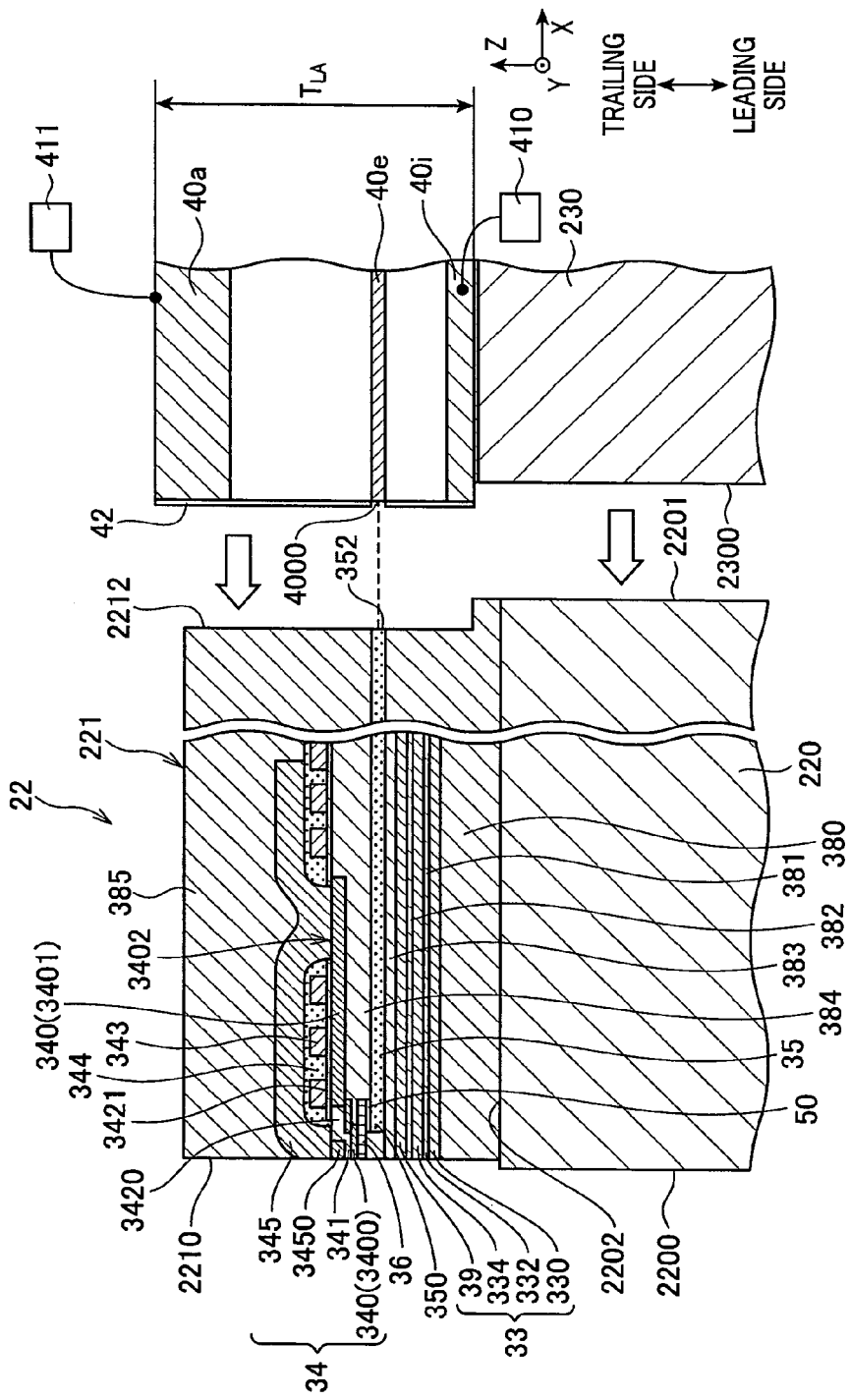
FIG. 8 is a cross-sectional view according to the A-A plane of FIG. 7 that schematically illustrates a structure of the essential components of a thermally-assisted magnetic recording head.

FIG. 8 schematically illustrates the structure of the essential components of the thermally-assisted magnetic recording head 21 and is an A-A plane cross-sectional view of FIG. 7.

As illustrated in FIG. 8, the MR element 33 includes the MR multilayer 332 as well as the lower shield layer 330 and the upper shield layer 334, as a pair, placed in a position to sandwich the insulating layer 381 and the MR multilayer 332. The MR element 33 is formed on the insulating layer 380 that is formed on the element formation surface 2202. The upper and lower shield layers 334 and 330 prevent the MR multilayer 332 from receiving external magnetic fields that become noise.

The upper and lower shield layers 334 and 330 are magnetic layers formed by, for example, a frame plating method or a sputtering method, and are composed of, for example, NiFe (Permalloy), FeSiAl (Sendust), CoFeNi, CoFe, FeN, FeZrN or CoZrTaCr, or the like, or a soft magnetic material of a multilayered film or the like of these materials. The thickness is, for example, approximately between 0.5~3 μm.

The MR multilayer 332 is a magnetic sensitive part that senses a signal magnetic field by using the MR effect and may be any of, for example, a CIP-GMR multilayer that utilizes a current in plane-giant magnetoresistive (CIP-GMR) effect, a CPP-GMR multilayer that utilizes a current perpendicular to plane-giant magnetoresistive (CPP-GMR) effect, or a TMR multilayer that utilizes a tunneling magnetoresistive (TMR) effect.

The MR multilayer 332 utilizing any type of the above MR effect can sense a signal magnetic field from a magnetic disk with high sensitivity. Moreover, when the MR multilayer 332 is a CPP-GMR multilayer or TMR multilayer, then the upper and lower shield layer 334 and 330 also performs the role of an electrode. Meanwhile, when the MR multilayer 332 is a CIP-GMR multilayer, then an insulating layer is provided between each of the upper and lower shield layers 334 and 330, and further, a magnetoresistive (MR) lead layer is provided that is electrically connected to the MR multilayer 332.

The MR multilayer 332 may be formed by various structures. For example, when the MR multilayer 332 is a TMR multilayer, the MR multilayer 332 may be formed with a structure by laminating the following layers: an antiferromagnetic layer with a thickness of about between 5~15 nm (nanometers) composed of, for example, IrMn, PtMn, NiMn, RuRhMn, or the like; a magnetization pinned layer in which two ferromagnetic layers composed of, for example, CoFe, or the like, sandwiches a nonferromagnetic metallic layer made of, such as Ru, and of which the magnetization direction is pinned by the antiferromagnetic layer; a tunnel barrier layer composed of a nonmagnetic dielectric material that is formed of a metallic film of a thickness of about between 0.5~1 nm and composed of, for example, Al, AlCu, or the like, the metallic film being oxidized either by natural oxidation or by oxygen directed into a vacuum device; a magnetization free layer that is structured from the two layered films of, for example, CoFe, or the like, with a thickness of about 1 nm and NiFe, or the like, with a thickness of about between 3~4 nm and that are ferromagnetic layers, and provides a tunnel exchange-coupling with the magnetization pinned layer through the tunnel barrier layer.

Similarly in FIG. 8, the electromagnetic conversion element 34 is for perpendicular magnetic recording, and provides a main magnetic pole layer 340, a gap layer 341, a write coil layer 343, a coil insulating layer 344, and a write shield layer 345.

The main magnetic pole layer 340 is formed on the insulating layer 384 composed of an insulating material such as $Al_2O_3$ (alumina), and is a waveguide for concentrating and guiding the magnetic flux that is generated by applying a writing electric current to the write coil layer 343 to the magnetic recording layer (perpendicular magnetization layer) of the magnetic disk for writing.

The main magnetic pole layer 340 has a structure in which the main magnetic pole 3400 and the main magnetic pole body part 3401 are sequentially laminated. Of these, the main magnetic pole 3400 reaches the head end surface 2210, and has a first main magnetic pole unit 3400a having a small width $W_p$ (see FIG. 10) in the track width direction, and a second main magnetic pole unit 3400b that is positioned above the first main magnetic pole unit 3400a and to the rear (+X side) of the first main magnetic pole unit 3400a.

In this manner, because the first main magnetic pole unit 3400a has a small $W_p$, a minute writing magnetic field can be generated, thereby enabling a track width to be set to a minute value which corresponds to a high recording density.

The main magnetic pole 3400 is formed from a soft magnetic material having a higher saturation magnetic flux density than the main magnetic pole body part 3401, and is formed from a soft magnetic material, for example, FeNi, FeCo, FeCoNi, FeN, or FeZrN or the like, that are ferrous alloys in which Fe is the main component. The thickness of the main magnetic pole unit 3400a is, for example, between 0.1 and 0.8 μm.

The gap layer 341 forms a gap for magnetically separating the main magnetic pole layer 340 and the write shield layer 345 in the vicinity of the head end surface 300. The gap layer 341 is structured of a non magnetic insulating material such as $Al_2O_3$ (alumina), $SiO_2$ (silicon dioxide), AlN (nitrous aluminum) or diamond-like carbon (DLC), or a nonmagnetic conductive material such as Ru (ruthenium). The thickness of the gap layer 341 is determined by the gap between the main magnetic pole layer 340 and the write shield layer 345, with, for example, a thickness of about between 0.01~0.5 μm.

The write coil layer 343 is formed on the insulating layer 3421 composed of insulating material such as $Al_2O_3$ (alumina) such that a part of the write coil layer 343 is disposed at least between the main magnetic pole layer 340 and the write shield layer 345 in a single revolution, and which has a spiral structure around the back contact part 3402 as the center.

The write coil layer 343 is formed of a conductive material, for example, Cu or the like. The write coil insulating layer 344 covers the write coil layer 343 that is made of an insulating material, such as a heat application cured photoresist, accordingly insulating intermediate surfaces between the write coil layer 343 and the main magnetic pole layer 340 and between the write coil layer 343 and the write shield layer 345.

The write coil layer 343, although a single layer in the present embodiment, may also be two or more layers or a helical coil. Further, the number of revolutions (windings) is not limited to the number illustrated in FIG. 8, for example, but is preferably set to between 2 and 7 revolutions.

The write shield layer 345 reaches the head end surface 2210 and functions as the conductive magnetic path for the magnetic flux returned from the soft magnetic under layer provided beneath the magnetic recording layer (perpendicular magnetization layer) of the magnetic disk. The thickness of the write shield layer 345 is, for example, about between 0.5~5 μm. Further, with respect to the write shield layer 345, the portion facing the main magnetic pole layer 340 similarly reaches the head end surface 2210 to be a trailing shield 3450 to introduce the spread magnetic flux emitted from the main magnetic pole layer 340.

The trailing shield 3450, in the present embodiment, is flattened together with the insulating film 3420 and the main magnetic pole body part 3401, and has a width in the track width direction larger than not only the first main magnetic pole unit 3400a but also the main magnetic pole body part 3401. By providing this type of a trailing shield 3450, the magnetic field gradient becomes steeper between the end of the trailing shield 3450 and the first main magnetic pole unit 3400a. As a result, signal output jitter is smaller and the error rate at the time of reading can be reduced. Further, the write shield layer 345 is formed from soft magnetic material, and particularly, the trailing shield 3450 has a high saturation magnetic flux density and is formed from NiFe (Permalloy) or a ferrous alloy material or the like that is similar to the main magnetic pole 3400.

As similarly illustrated in FIG. 8, the waveguide 35 and the surface plasmon-generator 36 are provided between the MR element 33 and the electromagnetic conversion element 34, and provide the near-field generator that is the optical system within the head unit 221. Here, the waveguide 35 extends from the end surface 352 (synonymous with reference number 1150a in FIG. 1~FIG. 5) to the end surface 350 of the head end surface 2210 side, the end surface 352 is parallel to the element formation surface 2202 and reaches the head end surface 2212.

Further, a portion of the upper surface (side surface) of the waveguide 35 and a portion of the bottom surface of the surface plasmon-generator (including the propagative edge 360 (FIG. 9)) are mutually opposed at a predetermined spacing, and the portion sandwiched between these portions becomes the buffer portion 50 having a lower refractive index than the refractive index of the waveguide 35.

The buffer portion 50 functions for coupling the laser light that propagates through the waveguide 35 to the surface plasmon-generator 36 in the surface plasmon mode. Moreover, the buffer portion 50 may be a portion of the insulating layer 384 that is a portion of the overcoat layer 38, and may be a new layer provided separately from the insulating layer 384. The waveguide 35, surface plasmon-generator 36, and the buffer portion 50 are further described referring to FIG. 9.

In addition, in the present embodiment, an interelement shield layer 39 is provided between the MR element 33 and the electromagnetic conversion element 34 (waveguide 35), the interelement shield layer 39 being sandwiched by the insulating layers 382 and 383. This interelement shield layer 39 functions for shielding the MR element 33 from the magnetic field generated from the electromagnetic conversion element 34, and may be formed of the same soft magnetic material as the upper and lower shield layers 334 and 330. Moreover, the interelement shield layer 39 is not essentially required and an embodiment that does not include the interelement shield layer 39 is also practical. Further, a bucking coil part may be formed between the interelement shield layer 39 and the waveguide 35.

The bucking coil part is configured to suppress a wide area adjacent tracks erasing (WATE) phenomenon that is an unnecessary writing operation and/or a deleting operation to the magnetic disk by generating a magnetic flux to neutralize the magnetic flux loop that starts at the electromagnetic conversion element 34 via the upper and lower shield layers 334 and 330 of the MR element 33.

Similarly as illustrated in FIG. 8, many materials may be used for the laser diode 40, which are commonly used for communications, optical system disk storage, and material analysis or the like. For example, these materials may include InP series, GaAs series, GaN series etc. A wavelength $\lambda_1$ of the irradiated laser light can be set arbitrarily in the range of for example, 375 nm~1.7 μm.

Specifically, for example, an InGaAs P/InP quaternary mixed crystal system laser diode can be used, of which the possible wavelength area is between 1.2~1.67 μm. The laser diode 40 has a multilayered structure that includes an upper electrode 40a, an active layer 40e, and a lower electrode 40i. A reflecting layer composed of $SiO_2$, $Al_2O_3$ or the like for exciting the oscillation due to the total reflection is formed in front and behind the cleavaged surface of the multilayered structure, and an opening is provided to the reflecting layer 42 in the position of the active layer 40e that includes the light emitting center 4000. Here, the thickness of the laser diode 40 can be, for example, between 60~200 μm.

In addition, a power source within the magnetic disk device can be used to drive the laser diode 40. In actuality, the magnetic disk device normally provides a power source of, for example, about 2V that is a sufficient voltage for the laser oscillation operation. Further, the power consumption of the laser diode 40 is, for example, about several tens of m Watt [mW], that can be sufficiently supplied from the power source in the magnetic disk device.

Actually, a predetermined voltage is applied by the power source between the terminal electrode 410 electrically connected to the lower electrode 40i and the terminal electrode 411 electrically connected to the upper electrode 40a. The laser light is irradiated from the opening that includes the light emitting center 4000 of the reflecting layer 42 by oscillating the laser diode 40.

Moreover, the laser diode 40 and the drive terminal electrodes 410 and 411 are not limited to the embodiment described above.

The light source unit 23 provides a unit substrate 230, and a laser diode 40 equipped to a light source installation surface 2302 of the unit substrate 230, a terminal electrode 410 electrically connected to an electrode that is the bottom surface 401 of the laser diode 40, and a terminal electrode 411 electrically connected to an electrode that is the top surface 403 of the laser diode 40. The terminal electrodes 410 and 411 are electrically connected to connection pads of the wiring member 203 equipped to the flexure 201 (see FIG. 6).

When a predetermined voltage is applied to the laser diode 40 through both of the electrodes 410 and 411, the laser light is irradiated from the light emitting center placed on the light emitting surface 400 of the laser diode 40. Here, in such a head structure illustrated in FIG. 8, it is preferred to set the oscillation direction of the electric field of the laser light generated by the laser diode 40 perpendicular (Z direction) to the lamination layer of the active layer 40e. In other words, the laser diode 40 is preferably a chip that generates TM mode polarization.

As described above, the thermally-assisted magnetic recording head 21 is configured by connecting the light source unit 23 and the slider 22. This connection allows the adhesion surface 2300 of the unit substrate 230 to join with the back surface 2201 of the slider substrate 220. At such time, the position of the unit substrate 230 and the slider substrate 220 are determined so that the laser light generated from the laser diode 40 just enters the end surface 352 that is an opposite side to the ABS 2200 of the waveguide 35.

Moreover, although the size of the slider 22 and the light unit 23 are discretionary, the slider may also be, for example, so-called a femto slider with a width of 700 μm in the track width direction (Y direction)×a height of 850 μm (Z direction)×a thickness of 230 μm (X direction). In this case, the light unit 23 may also be one size smaller than this, for example, with a width of 425 μm in the track width direction×a height of 300 μm×a thickness of 300 μm.

Figure 9:
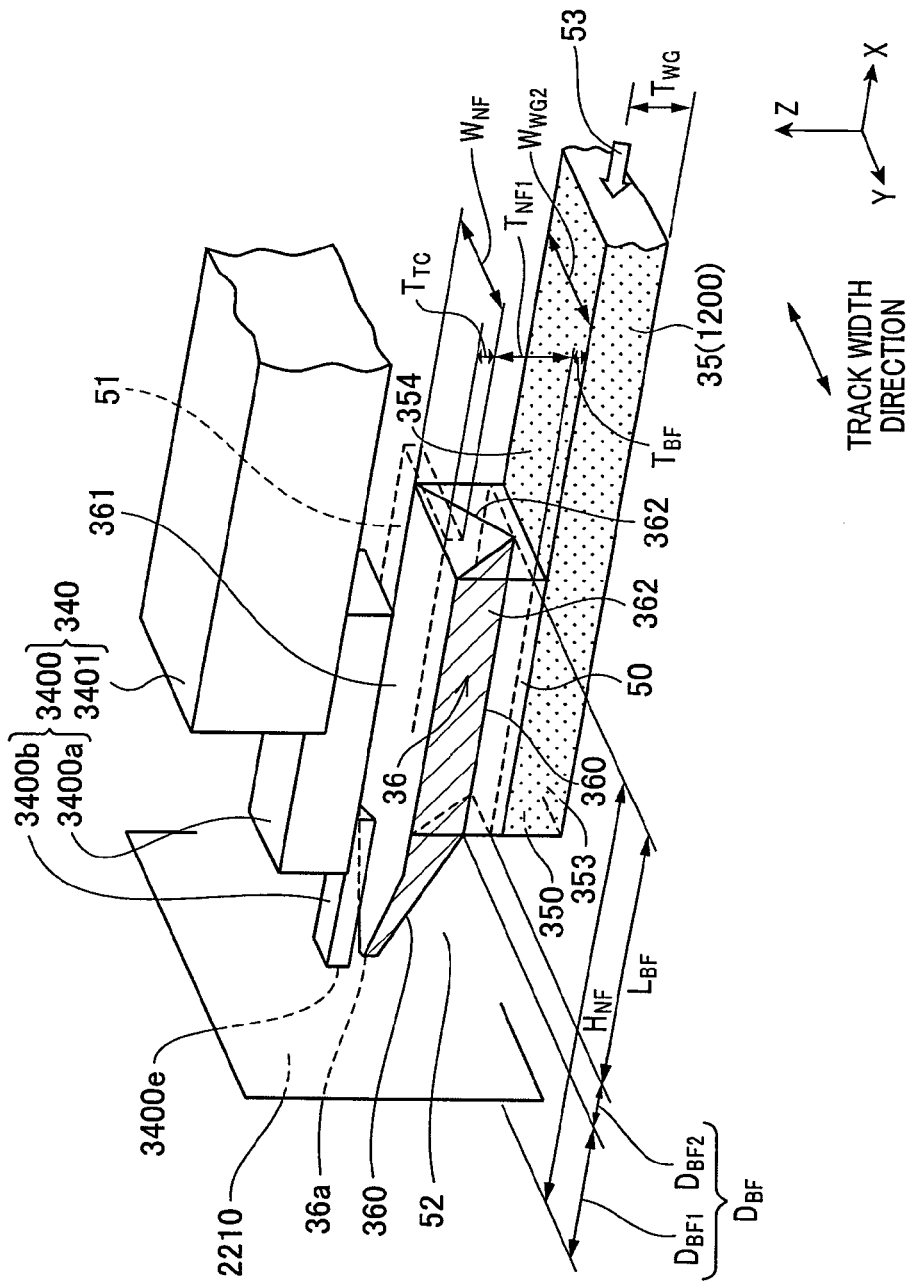
FIG. 9 is a perspective view schematically illustrating a structure of a waveguide, a surface plasmon-generator, and a main magnetic pole layer.

FIG. 9 is a perspective view schematically illustrating the structure of the waveguide 35, the surface plasmon-generator 36 and the main magnetic pole layer 340. In the same drawing, the head end surface 2210 is positioned to the left side, the head end surface including a portion from which the writing magnetic field and the near-field are irradiated toward the magnetic recording medium.

As illustrated in FIG. 9, the waveguide 35 is provided for propagating the laser light 53 for near-field generation, and the surface plasmon-generator 36 is provided which includes a propagative edge 360 through which the surface plasmon excited by the laser light 53 propagates. The location of the waveguide 35 partially illustrated in FIG. 9 corresponds to the waveguide core part 1152 in FIG. 1~FIG. 5.

Additionally, a portion sandwiched between a portion of the side surface 354 of the waveguide 350 and a portion of the bottom surface 362 that includes the propagative edge 360 of the surface plasmon-generator 36 facing the portion of the side surface 354 is the buffer portion 50. Namely, a portion of the propagative edge 360 is covered by the buffer portion 50.

The buffer portion 50 functions for coupling the laser light 53 to the surface plasmon-generator 36 in the surface plasmon mode. Here, side surfaces of the waveguide 35 indicate any surfaces among surfaces surrounding the waveguide 35 other than the end surface 350 of the head end surface 2210 that is perpendicular to the propagation direction (−X direction) of the laser light 53 and the other end surface of the opposing side thereof (not shown). These side surfaces are surfaces on which the laser light 53 propagated in the waveguide 35 corresponding to the core is completely reflected.

Moreover, in the present embodiment, a portion of the side surface 354 of the waveguide 35 contacts the buffer portion, and the side surface 354 is the upper surface of the waveguide 35. Further, the buffer portion 50 may also be a portion of the overcoat layer 38 (see FIG. 7), and may also be a new layer provided separately from the overcoat layer 38.

The surface plasmon-generator 36 further provides a near-field generation end surface 36a that reaches the head end surface 2210. The near-field generation end surface 36a is in the vicinity of the end surface 3400e that reaches the head end surface 2210 of the main magnetic pole 3400. Further, the propagative edge 360 extends from a portion covered by the buffer portion 50 where the portion couples with the laser light 53 in the surface plasmon mode, to the near-field generation end surface 36a, and functions for propagating the surface plasmon excited by the laser light 53 to the near-field generation end surface 36a.

Here, a portion of the propagative edge 360 of the head end surface 2210 side has, as it approaches toward the near-field generation end surface 36a, a liner shape or a curved shape elongating to approach toward the end surface 361 that is an opposite side of the propagate edge 360 of the surface plasmon-generator 36. Moreover, a corner of the propagative edge 360 may also be rounded in order to prevent the surface plasmon from escaping from the propagative edge 360. At this time, the curvature radius of the rounded corner is, for example, in the range of 5~500 nm.

Further, the surface plasmon-generator 36 in the present embodiment has a shape that tapers toward the near-field generation surface 36a in the height direction (Z direction) in the vicinity of the head end surface 2210.

Further, in the surface plasmon-generator 36, the cross-section according to the YZ plane has a triangular shape, and especially has a predetermined triangular shape in the vicinity of the head end surface 2210. As a result, the near-field generation end surface 36a, in the present embodiment, has a triangular shape of which a vertex is an end of the propagative edge 360 that reaches the end surface 36a (see FIG. 10). Here, when the surface plasmon that propagates through the propagative edge 360 reaches the near-field generation end surface 36a, the near-field is generated from the near-field generation end surface 36a.

The waveguide 35 and buffer portion 50 are provided at −Z side of the surface plasmon-generator 36 (bottom side of the drawing), namely, at the opposite side to the main magnetic pole 3400. As a result, the propagative edge 360 that is covered by the buffer portion 50 is also positioned on the opposite side to the main magnetic pole 3400. With such a structure, even if a distance between the end surface 3400e of the main magnetic pole 3400 that generates the write magnetic field and the near-field generation surface that generates the near-field is set sufficiently small (preferably 100 nm or less), the waveguide 35 can be sufficiently separated from the main magnetic pole 3400 and the main magnetic pole body part 3401. As a result, a situation can be avoided where a portion of the laser light 53 is absorbed by the main magnetic pole 3400 composed of metal and the main magnetic pole body part 3401, and the light amount that is expected to be converted to the near-field is reduced.

As illustrated in FIG. 9, the shape of the waveguide 35 (here synonymous with the waveguide core part 1152 in FIG. 1~FIG. 4) may be a rectangular cuboid. However, a width of a portion on the head end surface 2210 side in the track width direction (Y direction) may narrow. The width $W_{WG2}$ of the portion on the end surface 350 side in the track width direction (Y direction) can be, for example, between about 0.3~100 μm. The thickness $T_{WG}$ (Z direction) can be, for example, between 0.1~4 μm. The height (or length) (X direction) can be, for example, between about 10~300 μm.

Further, the side surfaces of the waveguide 35 or, in other words, the upper surface 354 and the lower surface 353, and both of the side surfaces 351 in the track width diction (Y direction) contact the overcoat layer 38, excluding the portion contacting the buffer portion 50 (see FIG. 7). Here, the waveguide 35 is configured from material having a higher refractive index $n_{WG}$ than the refractive index $n_{OC}$ of the structural material of the overcoat layer 38, and formed by, for example, a sputtering method or the like. Fore example, when the wavelength $\lambda_L$ of the laser light is 600 nm and the overcoat layer 38 is formed from $SiO_2$ (n=1.5), the waveguide 35 may be formed from $Al_2O_3$ (n=1.63). In addition, when the overcoat layer 38 is formed from $Al_2O_3$ (n=1.63), the waveguide 35 may be formed from $SiO_XN_Y$ (n=1.7~1.85), $Ta_2O_5$ (n=2.16), $Nb_2O_5$ (n=2.33), TiO (n=2.3~2.55) or $TiO_2$ (n=2.3~2.55). By configuring the waveguide with these types of materials, propagation loss of the laser light 53 can be maintained at a low level due to the favorable optical properties of the materials. In addition, while the waveguide 35 functions as the core, the overcoat layer 38 functions as the clad. Thereby, a complete reflection condition for every side surface is prepared. Accordingly, more of the laser light 53 reaches the buffer portion 50, which improves the propagation efficiency of the waveguide 35.

Here, the waveguide 35 has a multilayered structure of dielectric material, and in which the higher layer may have a larger refractive index n than a lower layer. For example, by sequentially laminating conductive material in which the value of the composition ratio of X and Y is suitably altered in $SiO_XN_Y$, this type of the multilayered structure can be realized. The number of the lamination layers can be, for example, between 8~12 layers.

As a result, when the laser light 53 is directly polarized in the Z direction, more laser light 53 (a larger amount of the laser light) can be propagated to the buffer portion 50 side in the Z direction. At this time, a desired propagation position can be realized in the Z direction of the laser light 53 by selecting the composition of each layer, the layer thickness, and layer count for this multilayered structure.

The surface plasmon-generator 36 is preferably formed from conductive material such as a metal, for example, Pd, Pt, Rh, Ir, Ru, Au, Ag, Cu or Al, or from alloys composed of a plurality of the elements. Further, the width $W_{NF}$ of the tracking width direction (Y direction) in the upper surface 361 of the surface plasmon-generator 36 can be set sufficiently smaller than the wavelength of the laser light 53, for example, between about 10~100 nm. The thickness $T_{NF1}$ (Z direction) can also be set sufficiently smaller than the wavelength of the laser light 53, for example, between about 10~100 nm. The length (height) (X direction) of the HNF can be set, for example, between about 8~6.0 μm.

The buffer portion 50 is formed from a dielectric material that has a refractive index $N_{BF}$ lower than the refractive index $N_{WG}$ of the waveguide 35. For example, when the wavelength $\lambda_L$ of the laser light is 600 nm and the waveguide 35 is formed from $Al_2O_3$ (n=1.63), the buffer portion 50 may be formed from $SiO_2$ (n=1.46).

In addition, when the waveguide 35 is formed from $Ta_2O_5$ (n=2.16), the buffer portion 50 may be formed from $SiO_2$ (n=1.46) or $Al_2O_3$ (n=1.63). In these cases, the buffer portion 50 can be a portion of the overcoat layer 38 (FIG. 7) that functions as the clad composed from $SiO_2$ (n=1.46) or $Al_2O_3$ (n=1.63).

Further, the length of the buffer portion 50 (in the X direction), in other words, the length $L_{BF}$ of the coupling portion between the waveguide 35 and the surface plasmon-generator 36, is preferably between 0.5~5 μm. The thickness $T_{BF}$ of the buffer portion 50 (in the Z direction) is preferably between 10~200 nm. The length $L_{BF}$ and the thickness $T_{BF}$ of the buffer portion 50 are critical parameters for achieving suitable excitation and propagation of the surface plasmon.

Further, the end of the head end surface 2210 side of the buffer portion 50 is separated from the head end surface 2210 by only the distance $D_{BF}$ in the X direction. A propagation distance of the surface plasmon is regulated by the distance $D_{BF}$.

Similarly as illustrated in FIG. 9, a thermal conductive layer 51 is preferably provided between the surface plasmon-generator 36 and the first main magnetic pole 3400a, and provided on the head end surface 2210 side. The thermal conductive layer 51 is formed from an insulating material, for example, AlN, SiC or DLC or the like, having a high thermal conductivity compared with the overcoat layer 38 (see FIG. 7). By providing this type of thermal conductive layer 51, a portion of the heat can be released to the main magnetic pole 3400 and the main magnetic pole body part 3401 through the thermal conductive layer 51. The heat is generated at the time when the surface plasmon-generator 36 generates the near-field.

In other words, the main magnetic pole 3400 and the main magnetic pole body part 3401 can be used as heat sinks. As a result, an excessive temperature increase of the surface plasmon-generator 36 can be suppressed, and an unnecessary protrusion in the near-field generation end surface 36a and a sharp drop in optical power efficiency in the surface plasmon-generator 36 can be avoided.

The thickness $T_{TC}$ of the thermal conductive layer 51 is set to a sufficiently small value of 100 nm or less that corresponds to a spacing $D_{N-P}$ (see FIG. 10) between the near-field generation end surface 36a above the head end surface 2210 and the end surface 3400e of the main magnetic pole 3400.

Additionally, the refractive index $n_{IN2}$ of the thermal conductive layer 51 is set to be the same or less than the refractive index $n_{IN1}$ of the insulating layer 52 that covers the propagative edge 360 of the surface plasmon-generator 36. In other words, the propagative edge 360 of the surface plasmon-generator 36 is prepared so as to be covered by a material having the same refractive index $n_{IN2}$ as the material covering the opposite side end surface 361 or by a material having a higher refractive index $n_{IN1}$.

Accordingly, the surface plasmon can be stably propagated on the propagative edge 360. In actuality, it is understood that refractive index $n_{IN1} \geqq$ refractive index $n_{IN2} \times 1.5$ is preferred.

Similarly illustrated in FIG. 9, the main magnetic pole layer 340, as described above, includes the main magnetic pole 3400 and the main magnetic pole body part 3401. Of these, the main magnetic pole 3400 includes the first main magnetic pole unit 3400a having an end surface 3400e that reaches the head end surface 2210, and a second main magnetic pole unit 3400b where the end of the head end surface 2210 side overlaps onto a portion of the opposing side to the head end surface 2210 of the first main magnetic pole unit 3400a.

Further, the end of the head end surface 2210 side of the main magnetic pole body part 3401 overlaps onto a portion of the opposing side to the head end surface 2210 of the second main magnetic pole unit 3400b. In this manner, the portion of the head end surface 2210 of the main magnetic pole layer 340 inclines so as to approach the end of the head end surface 2210 side of the surface plasmon-generator in relation to the element formation surface 2202 (see FIG. 8) while facing toward the head end surface 2210. Accordingly, the main magnetic pole layer 340 is sufficiently separated from the waveguide 35, and the end surface 3400e of the main magnetic pole 3400 can be sufficiently closed to the near-field generation end surface 36a.

Figure 10:
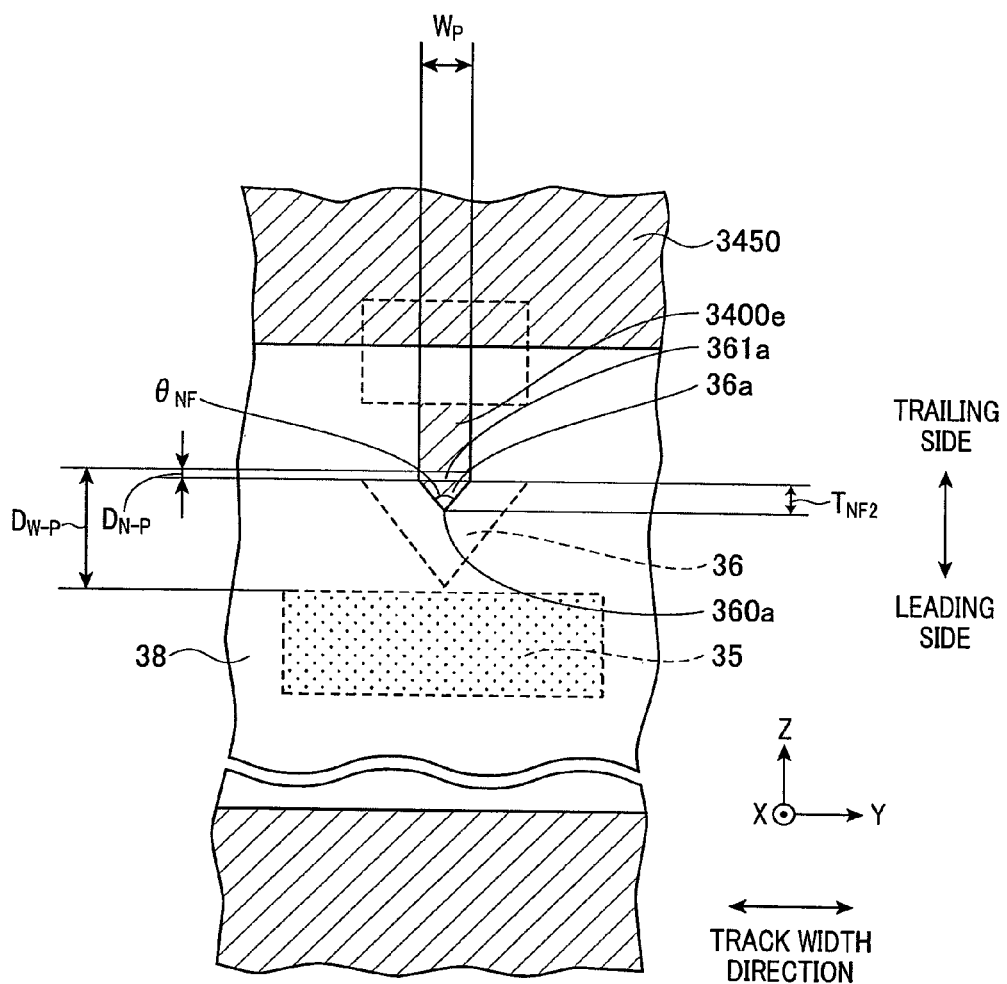
FIG. 10 is a plan view illustrating the shape of the end surface on the head end surface of an electromagnetic conversion element and a surface plasmon-generator.

FIG. 10 is a plan view illustrating the shape of the end surface on the head end surface 2210 of the electromagnetic conversion element 34 and the surface plasmon-generator 36.

As illustrated in FIG. 10, in the electromagnetic conversion element 34, the main magnetic pole 3400 (first main magnetic pole unit 3400a) and the write shield layer 345 (trailing shield 3450) reach the head end surface 2210. Of these, the shape of the end surface 3400e on the head end surface 2210 of the main magnetic pole 3400 is, for example, a rectangle, a square, or a trapezoid.

Herein, the width $W_P$ described above is the length of the edge of the leading side in the end surface 3400e of the main magnetic pole 3400, and it determines the width of the track formed on the magnetic recording layer of the magnetic disk. The width $W_P$ is, for example, between about 0.05~0.5 μm.

Further, the near-field generation end surface 36a of the surface plasmon-generator 36 is in the vicinity of the end surface 3400e of the main magnetic pole 3400 on the head end surface 2210, and positioned at the leading side (−Z side) of the end surface 3400e. Herein, when the spacing between the near-field generation end surface 36a and the end surface 3400e is defined as $D_{N-P}$, it is preferred that the spacing $D_{N-P}$ is a sufficiently small value of 100 nm or below, and particularly 20 nm or above, and further preferably 30 nm or above.

With the thermally-assisted magnetic recording head of the present embodiment, because the near-field generation end surface 36a is an essential heating action part and the end surface 3400e is the writing part, a writing magnetic field having a sufficiently large gradient can be applied to a sufficiently heated part in the magnetic recording layer of the magnetic disk. Accordingly, a stable writing operation can be reliably implemented through thermal assistance.

In addition, with respect to the near-field generation end surface 36a, in the present embodiment, the bottom edge 361a is held at the trailing side (+Z side) on the head end surface 2210, and the end 360a of the propagative edge 360 is the vertex of the leading side (−Z side) so that an isosceles triangle is formed. The height (thickness of the head end surface 2210 of the surface plasmon-generator 36) $T_{NF2}$ of the near-field generation end surface 36a is preferably 30 nm or below, and more preferably 20 nm or below. Accordingly, the near-field light emitting position on the near-field generation end surface 36a is in the vicinity of the end edge 361a on the trailing side and becomes closer to the end surface 3400e of the main magnetic pole 3400.

Further, the vertex angle $\theta_{NF}$ in the vertex 360a of the isosceles triangle is preferably between about 60~130 deg., and particularly more preferably between about 80~110 deg. By adjusting the vertex angle $\theta_{NF}$, the light emitting position of the near-field in the near-field generation end surface 36a can be on the trailing side.

Additionally, when the spacing between the waveguide 35 and the main magnetic pole 3400 is $D_{W-P}$, the spacing $D_{W-P}$ can be sufficiently large when the spacing $D_{N-P}$ described above is set to an extremely small value. In other words, according to the structure illustrated in FIG. 9, the waveguide 35 can be sufficiently separated from the main magnetic pole 3400 and the main magnetic pole body part 3401. As a result, a situation can be avoided in which a portion of the laser light is absorbed by the main magnetic pole 3400 made of metal or the main magnetic pole body part 3401, thereby reducing the quantity of light converted to the near-field.

Figure 11:
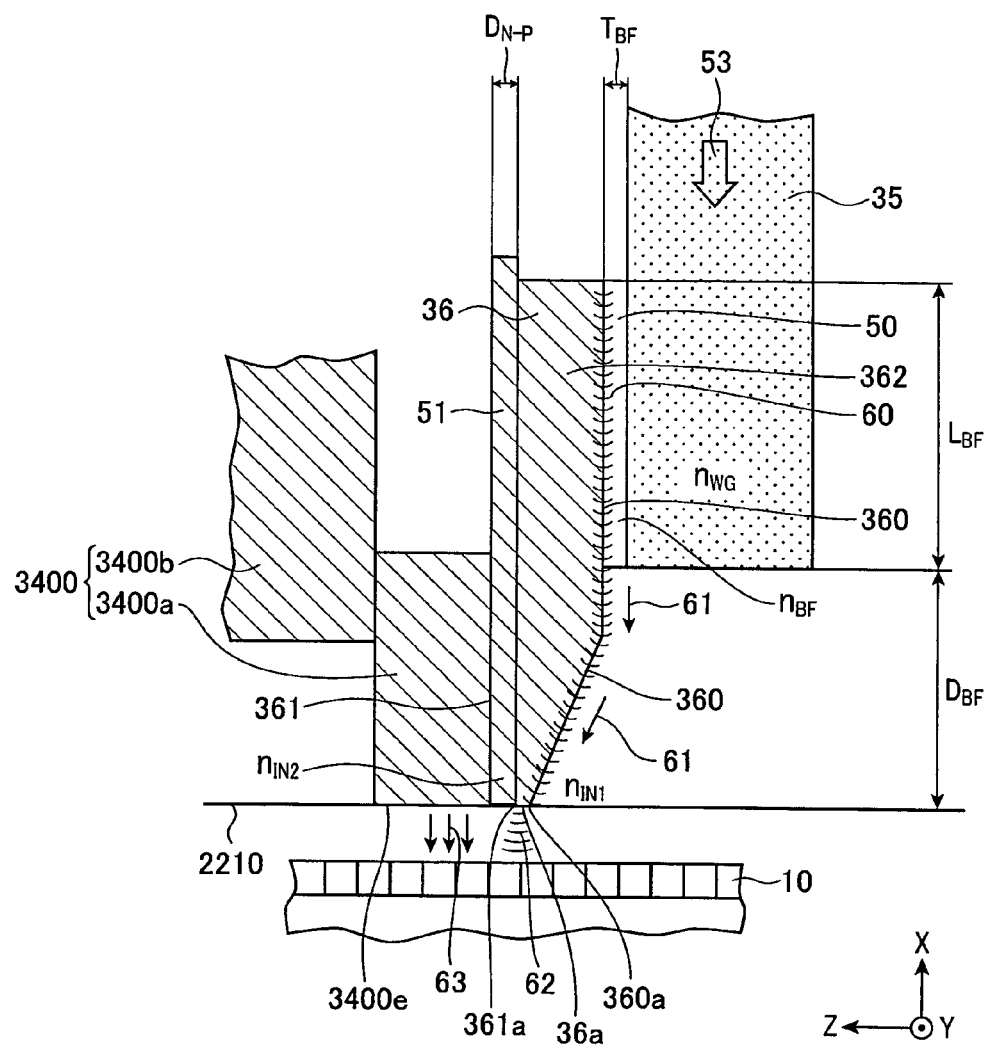
FIG. 11 is a schematic diagram to illustrate a thermally-assisted magnetic record that utilizes a surface plasmon mode.

FIG. 11 is a schematic for describing thermally-assisted magnetic recording that uses a surface plasmon mode.

As illustrated in FIG. 11, at the time of writing to the magnetic recording layer of the magnetic disk 10 through the electromagnetic conversion element 34, initially, the laser light 53 irradiated from the laser diode 40 of the light source unit 23 propagates through the waveguide 35. Next, the laser light 53 that advances to the vicinity of the buffer portion 50 is coupled with an optical configuration of the waveguide 35 having a refractive index $n_{WG}$, the buffer portion 50 having a refractive index $n_{BF}$, and the surface plasmon-generator 36 composed of a conductive material such as a metal, and induces the surface plasmon mode to the propagative edge 360 of the surface plasmon-generator 36. In other words, it is coupled to the surface plasmon-generator 36 in the surface plasmon mode.

In actuality, the evanescent light within the buffer portion 50 is excited from the optical field conditions of the buffer portion 50 and the waveguide 35 that are the core. Next, the surface plasmon mode is induced in a form in which the evanescent light and the electric load fluctuation is excited by the metal surface (propagative edge 360) of the surface plasmon-generator 36, thereby exciting the surface plasmon. Moreover, more precisely, what is being excited in this system is the surface plasmon polariton because the surface plasmon, which is the elementary excitation, is coupled with the electromagnetic wave. However, hereinafter surface plasmon polariton will be abbreviated to surface plasmon.

The propagative edge 360 is in the closest position to the waveguide 35 in the inclined lower surface 362 of the surface plasmon-generator 36, and since the electric field which is the angular part is easily focused, the surface plasmon is easily excited. At this time, the induction of the surface plasmon can be realized by setting so that the refractive index $n_{BF}$ of the buffer portion 50 is set smaller than the refractive index $n_{WG}$ of the waveguide 35 ($n_{BF} < n_{WG}$), and by appropriately selecting the height of the aforementioned buffer portion 50 (of the X direction), namely, the length $L_{BF}$ of the coupled portion of the waveguide 35 and the surface plasmon-generator 36, and the thickness $T_{BF}$ of the buffer portion 50 (of the Z direction). The induction of the surface plasmon mode is described in, for example, Michael Hochberg, Torn Baehr-Jones, Chris Walker & Axel Scherer, "Integrated Plasmon and Dielectric Waveguides", OPTICS EXPRESS Vol. 12, No. 22, pp 5481-5486 (2004), and in U.S. Patent Publication No. 2005/0249451 A1.

The surface plasmon 60 in the inducted surface plasmon mode is excited on the propagative edge 360 of the surface plasmon-generator 36 and propagates on the propagative edge 360 along the arrow indicator 61. The propagation of the surface plasmon 60 is realized under the following condition: the propagative edge 360 of the surface plasmon-generator 36 is covered with a material having the same index as the refractive index $n_{IN2}$ of a material covering the end surface 361 that is opposite to the propagative edge 360, or covered with another material having a higher refractive index $n_{IN1}$ than the index $n_{IN2}$. Actually, it is understood that the preferred condition is that the refractive index $n_{IN1} \geq$ (refractive index $n_{IN2} \times 1.5$). In FIG. 11, the refractive index $n_{IN2}$ of the thermal conductive layer 51 is set to be lower than the refractive index $n_{IN1}$ of the insulating layer 52 that covers the propagative edge 360 of the near-field generation layer 36.

On account of the surface plasmon 60 propagating in this manner, the surface plasmon 60, in other words, the electric field, concentrates on the near-field generation end surface 36a having the vertex 360a which is the arrival point of the propagative edge 360 that reaches the head end surface 2210.

As a result, the near-field 62 is generated from the near-field generation end surface 36a. The near-field 62 is irradiated toward the magnetic recording layer of the magnetic disk 10, reaches the surface of the magnetic disk 10, and heats a portion of the magnetic recording layer of the magnetic disk 10. Accordingly, the anisotropy magnetic field (coercive force) of such a portion is lowered to a level where writing is possible. Immediately thereafter, writing is performed to this portion by applying the writing magnetic field 63 that is generated from the main magnetic pole 3400. Thermally-assisted magnetic recording becomes possible by following this type of sequence in this manner.

Here, as described above, the light emitting position of the near-field 62 on the near-field generation end surface 36a can be positioned at the trailing side (the end edge 361a side) that is nearer to the first main magnetic pole unit 3400a by adjusting the shape and size of the near-field generation end surface 36a on the head end surface 2210. Accordingly, a writing magnetic field having a sufficiently large gradient can be applied to a sufficiently heated part of the magnetic recording layer of the magnetic disk 10. As a result, a stable writing operation can be reliably implemented through thermal assistance.

Further, in the above surface plasmon-generator 36, the propagative edge 360 in which the surface plasmon propagates is a propagation region that has a very narrow width in the track width direction. Further, the cross-section according to the YZ plane of the surface plasmon-generator 36 in the present embodiment has a triangular shape, and particularly has a predetermined triangular shape in the vicinity of the head end surface 2210. Therefore, the near-field generation end surface 36a, which is exposed at the polished surface, is formed in a predetermined shape (triangular in the present embodiment) with an extremely small size. Thereby, it is possible to surely propagate the surface plasmon.

In addition, in thermally-assisted magnetic recording that uses the surface plasmon mode such as described above, the optical power efficiency in the surface plasmon-generator 36 is more or less about 20%, which is in contrast to about 5 to 10% or less, as can be seen in reported examples using a conventional plasmon-generator. This is a significant improvement.

In this manner, protrusions toward the magnetic disk 10 of the near-field generation end surface 36a can be suppressed without the surface plasmon-generator 36 being heated in an extreme manner.

Further, in the conventional embodiment in which laser light propagated by the waveguide is directly irradiated to the plasmon-generator provided in the head end surface position, a large portion of the irradiated laser light is converted to heat energy within the plasmon-generator. Meanwhile, the size of the plasmon-generator is set to be below the laser light wavelength, and the solid volume thereof is very small. Therefore, the plasmon-generator, on account of this heat energy, reaches extremely high temperatures up to, for example, 500° C. In contrast to this, the thermally-assisted magnetic recording head in the present embodiment utilizes the surface plasmon mode and generates the near-field 62 by propagating the surface plasmon 60 towards the head end surface 2210.

By doing this, the temperature at the time of near-field generation in the near-field generation end surface 36a is greatly reduced to about, for example, 100° C. As a result, protrusion of the near-field generation end surface 36a in a direction toward the magnetic disk 10 is suppressed, thereby enabling favorable thermally-assisted magnetic recording.

Figure 12A:
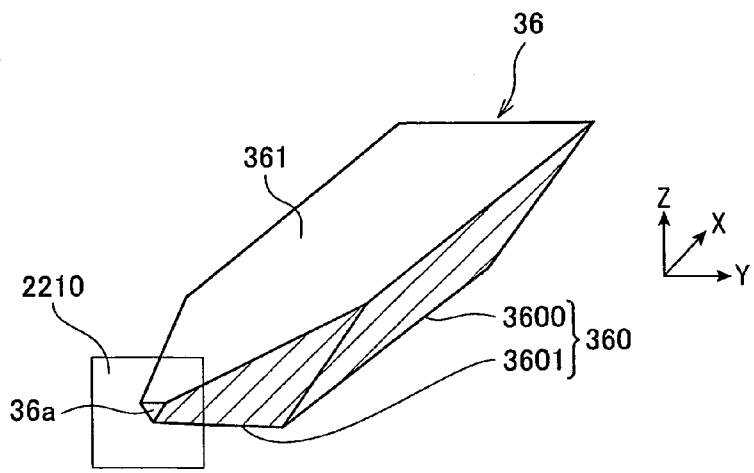
FIGS. 12A~C are schematic diagrams illustrating various embodiments with the surface plasmon-generator.
Figure 12B:
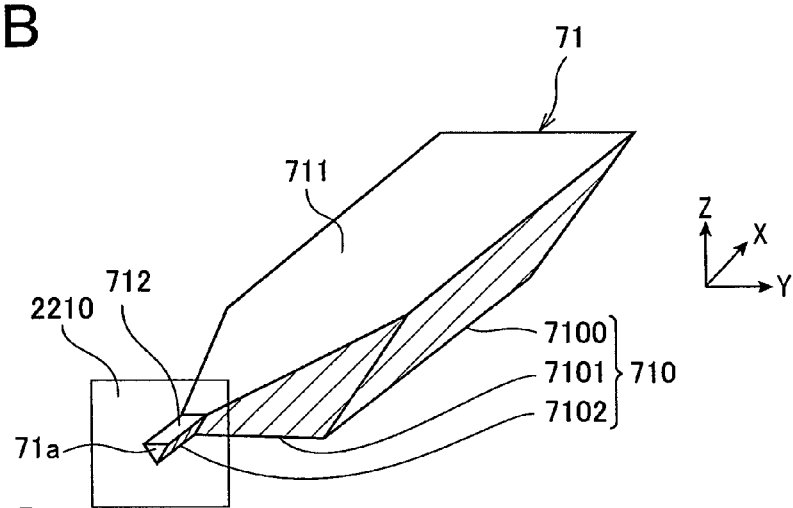
Figure 12C:
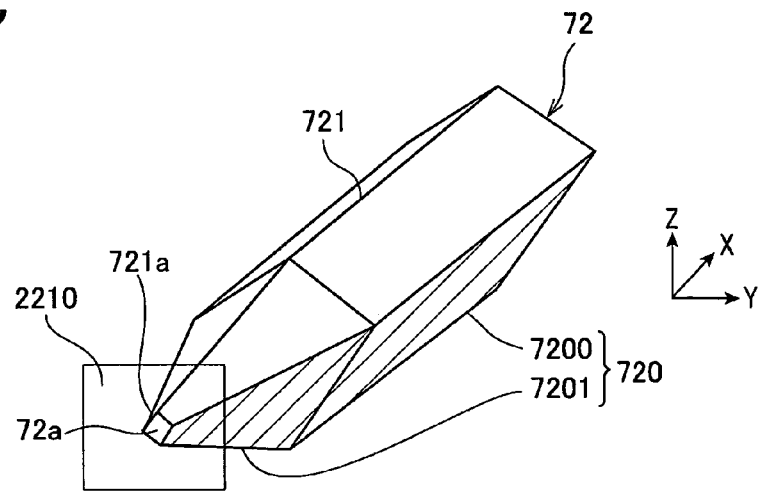

FIGS. 12A~12C are schematic views illustrating various embodiments for the surface plasmon-generator according to the present invention.

According to the embodiment illustrated in FIG. 12A, the surface plasmon-generator 36 illustrated in FIG. 9 is blade shaped. Herein, the propagative edge 360 corresponding to the blade tip includes a portion 3600 parallel to the upper surface 361 that is the end surface of the opposite side to the propagative edge 360, and includes a portion 3601 that extends so as to approach the upper surface 361 as moving toward the near-field generation end surface 36a (head end surface 2210) and that reaches the near-field generation end surface 36a. In addition, the cross-sectional shape according to the YZ plane (surface parallel to the head end surface 2210) forms an isosceles triangle with the propagative edge 360 making a vertex, and the shape of the near-field generation end surface 36a also forms an isosceles triangle.

According to the embodiment illustrated in FIG. 12B, the surface plasmon-generator 71 has a shape in which the protrusion 712 is linked to the portion of the blade shape. Here, the propagative edge 710 corresponding to the blade tip includes a portion 7100 parallel to the propagative edge upper surface 711, a portion 7101 that extends so as to approach the upper surface 711 as moving toward the near-field generation end surface 71a, and a portion 7102 that is parallel to the upper surface 701 and reaches the near-field generation end surface 71a (head end surface 2210). In addition, the cross-sectional shape in the YZ plane (surface parallel to the head end surface 2210) forms an isosceles triangle with the propagative edge 710 forming a vertex, and the shape of the near-field generation end surface 71a also forms an isosceles triangle.

With this manner of surface plasmon-generator 71, the near-field light emitting position on the near-field generation end surface 71a can be adjusted, for example, more upwardly (+Z direction) by adjusting the size and vertex angle of the isosceles triangle of the near-field generation end surface 71a. As a result, a writing magnetic field having a sufficiently large gradient can be applied to a sufficiently heated part in the magnetic recording layer of the magnetic disk by arranging the surface plasmon-generator 71 sufficiently near to the main magnetic pole.

According to the embodiment illustrated in FIG. 12C, the surface plasmon-generator 72 provides a near-field generation end surface 72a that is a square (diamond shaped in the present embodiment). Herein, the propagative edge 720 includes a portion 7200 that is parallel to the upper edge 721, and a portion 7201 that extends so as to approach the upper edge 721 as moving toward the near-field generation end surface 72a and that reaches the near-field generation end surface 72a. In addition, the cross-sectional shape in the YZ plane (surface parallel to the head end surface 2210) forms a square (diamond shaped in the present embodiment) in which the propagative edge 720 portion forms a single vertex.

With this manner of surface plasmon-generator 72, the light emitting position of the near-field on the near-field generation end surface 72a can be adjusted, for example, to the end 721a of the edge 721 by adjusting the size and vertex angle of the diamond shape of the near-field generation end surface 72a. As a result, a writing magnetic field having a sufficiently large gradient can be applied to a sufficiently heated part of the magnetic recording layer of the magnetic disk by arranging the surface plasmon-generator 72 sufficiently near to the main magnetic pole.

FIGS. 13A~13D are schematic views illustrating various embodiments that relate to the shape and arrangement of the waveguide according to the present invention, surface plasmon-generator and the main magnetic pole.

Figure 13A:
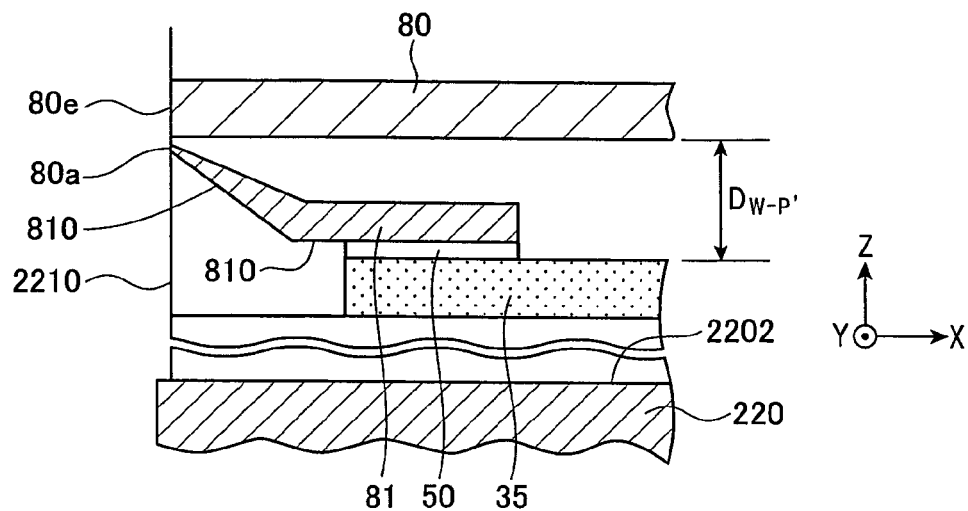
FIG. 13A~D are schematic diagrams illustrating various embodiments that relate to the shape and arrangement of the waveguide, surface plasmon-generator, and main magnetic pole.

According to FIG. 13A, the main magnetic pole 80 is a single layer that extends in parallel to the element formation surface 2202. Further, the portion of the head end surface 2210 side of the surface plasmon-generator 81 inclines with respect to the element formation surface 2202 so as to approach the end part of the head end surface 2210 side of the main magnetic pole 80 as moving toward the head end surface 2210. Even in this type of embodiment, on the head end surface 2210, the distance $D_{W-P}'$ in the Z direction between the waveguide 35 and main magnetic pole 80 can be set to a sufficiently large value while positioning the near-field generation end surface 81a of the surface plasmon-generator 81 in the vicinity of the end surface 80e of the main magnetic pole 80. Accordingly, it is more surely possible to avoid a situation where a portion of laser light is absorbed by the main magnetic pole, causing a reduction of a light quantity that is to be converted to the near-field.

Figure 13B:
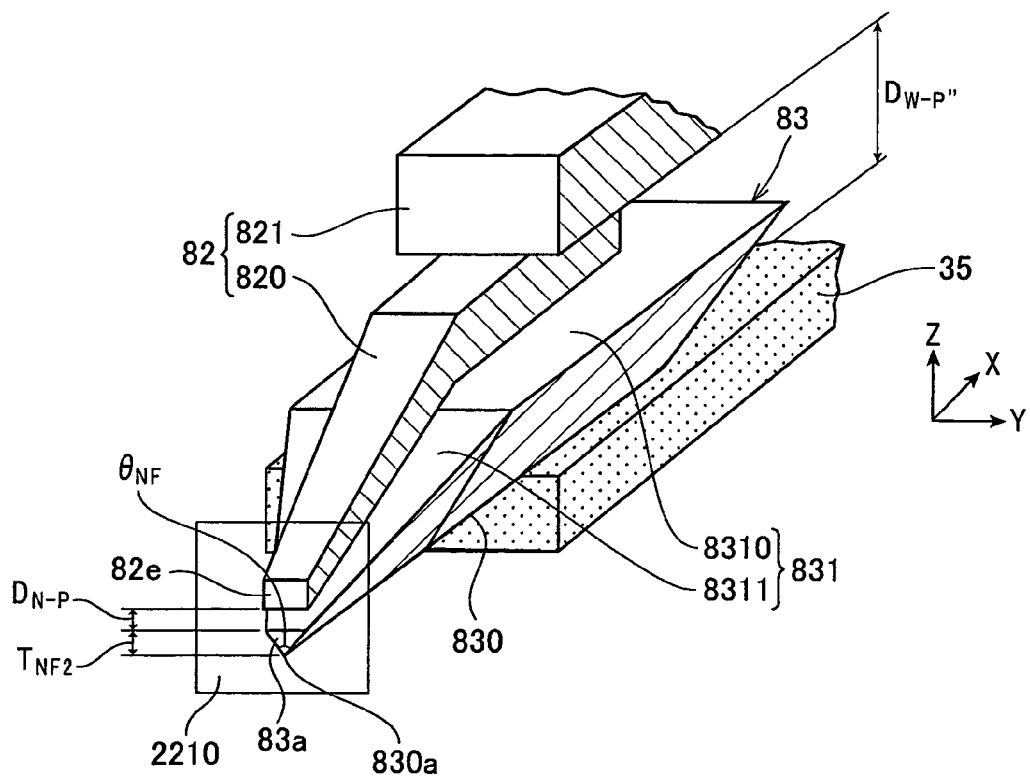

According to FIG. 13B, the surface plasmon-generator 83 provides a propagative edge 830 that extends in a straight line to reach the near-field generation end surface 83a. Further, the end surface 831 that is the opposite side to the propagative edge 830 of the surface plasmon-generator 83 includes a portion 8310 that is parallel to the propagative edge 830 and a portion 8311 that inclines so as to approach the propagative edge 830 as moving toward the near-field generation end surface 83a. In addition, the cross-sectional shape in the YZ plane (surface parallel to the head end surface 2210) of the surface plasmon-generator 83 forms an isosceles triangle with the propagative edge 830 making a vertex, and the shape of the near-field generation end surface 83a also forms an isosceles triangle.

Further, the main magnetic pole layer 82 includes a main magnetic pole 820 and a main magnetic pole body part 821. Of these, the portion of the head end surface 2210 side of the main magnetic pole 820 inclines so as to approach the portion of the head end surface 2210 side of the surface plasmon-generator 83, in other words, the end surface portion 8311, as moving toward the head end surface 2210. Even in this type of embodiment, on the head end surface 2210, the distance $D_{W-P}''$ in the Z direction between the waveguide 35 and the main magnetic pole 82 can be set to a sufficiently large value while positioning the near-field generation end surface 83a of the surface plasmon-generator 83 in the vicinity of the end surface 82e of the main magnetic pole 82. Accordingly, it is more surely possible to avoid a situation where a portion of laser light is absorbed by the main magnetic pole, causing a reduction of a light quantity that is to be converted to the near-field.

Figure 13C:
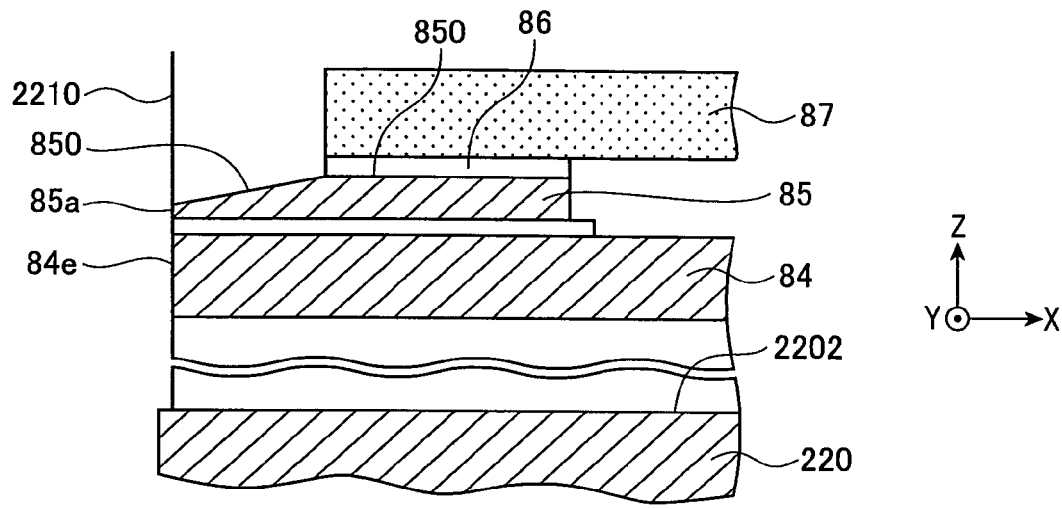

According to FIG. 13C, in the present embodiment, the main magnetic pole 84, the surface plasmon-generator 85, the buffer portion 86, and the waveguide 87 are layered in order from the slider substrate 220 side toward the +Z direction. Further, the propagative edge 850 that propagates the surface plasmon is positioned at the opposite side to the main magnetic pole 84 of the surface plasmon-generator 85, and extends to the near-field generation end surface 85a. As a result, the near-field generation end surface 85a is arranged at the trailing side (+Z side) of the end surface 84e of the main magnetic pole 84 on the head end surface 2210. Even in this type of embodiment, a writing magnetic field having a sufficiently large gradient can be applied to a sufficiently heated part of the magnetic recording layer of the magnetic disk by arranging the surface near-field generation end surface 85a sufficiently near to the end surface 84e of the main magnetic pole 84.

Figure 13D:
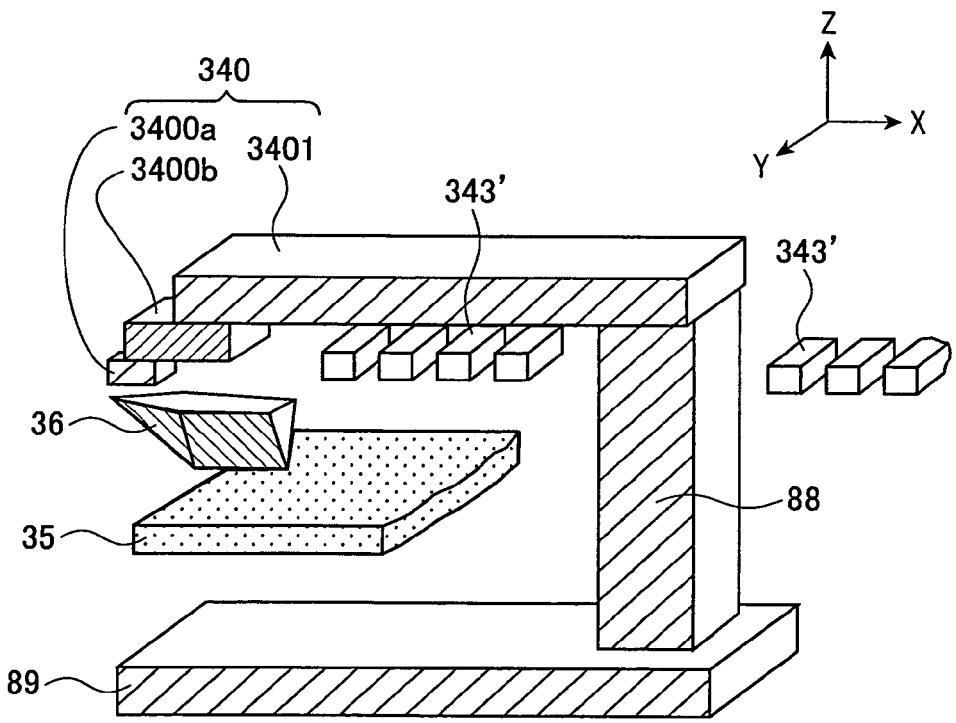

In the embodiment illustrated in FIG. 13D, the arrangement of the waveguide 35, the surface plasmon-generator 36, and the main magnetic pole layer 340 is the same as the embodiment illustrated in FIG. 8 and FIG. 9; however the write shield layer 89 that is the return yoke to receive the magnetic flux that returns from the magnetic disk is provided at the opposite side to the waveguide 35 and the main magnetic pole layer 340 of the surface plasmon-generator 36, namely, the leading side (−Z side). Further, the write shield layer 89 and the main magnetic pole layer 340 are electrically connected by the back contact part 88. In addition, the write coil layer 343' is formed such that a part of the write coil layer 343 is disposed between at least the main magnetic pole layer 340 and the write shield layer 89 during a single revolution, and has a spiral structure that is rotated around the back contact part 88 as the center. Even in this type of embodiment, favorable thermally-assisted magnetic recording can be performed using the surface plasmon of the present invention.

Figure 14:
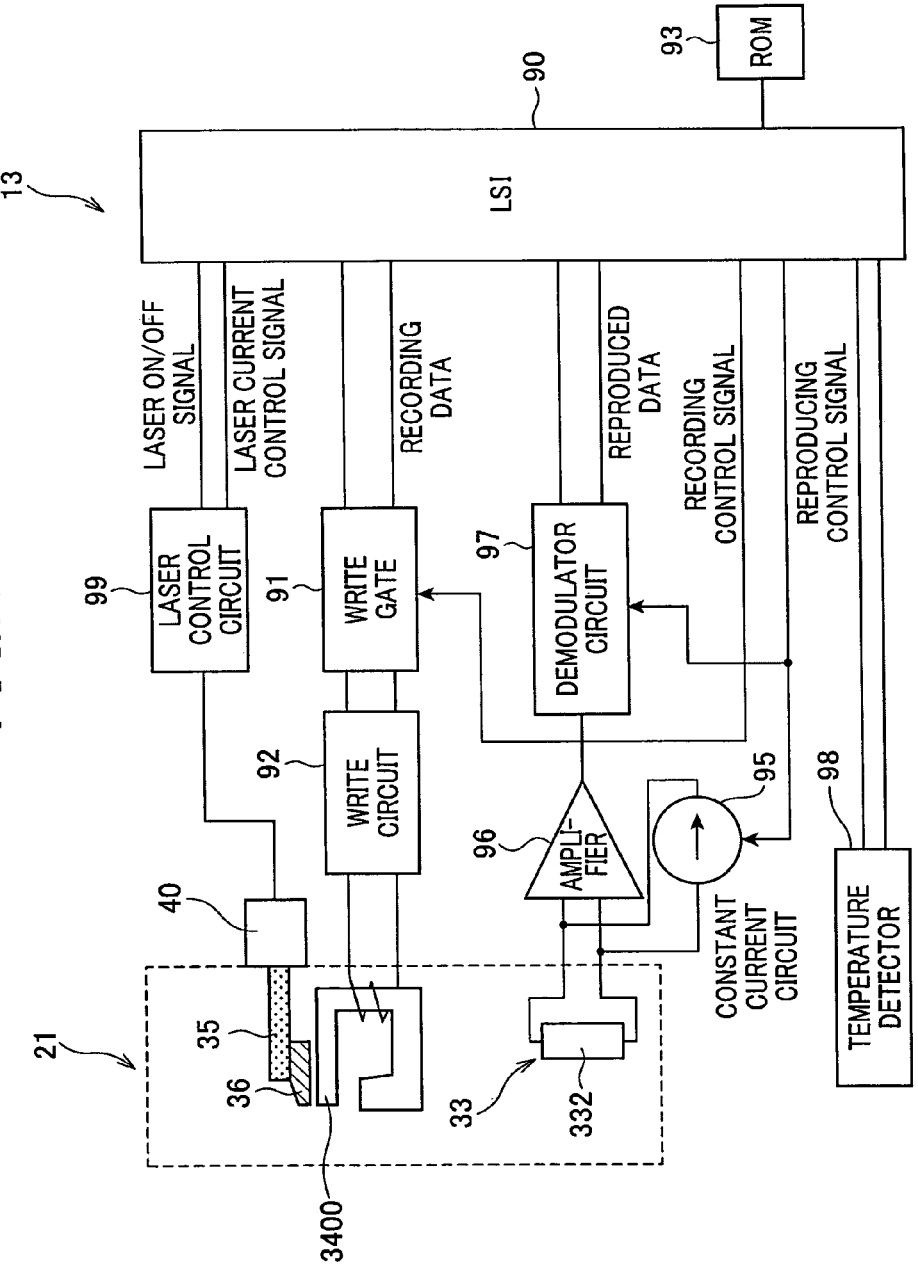
FIG. 14 is a block diagram illustrating the circuit structure of the light emission control circuit and the record reproduction of the magnetic disk device illustrated in FIG. 6.

FIG. 14 is a block view illustrating the circuit configuration of the record reproduction and light emitting control circuit 13 of the magnetic disk device illustrated in FIG. 6.

Respectively illustrated in FIG. 14, 90 is a control large-scale integration (LSI); 91 is a write gate to receive the recorded data from the control LSI 90; 92 is a write circuit; 93 is a read-only memory (ROM) for storing control tables of operating current values that are supplied to the laser diode 40; 95 is a constant current circuit for supplying sense current to the MR element 33; 96 is an amplifier for amplifying the output voltage of the MR element 33; 97 is a demodulator circuit for amplifying reproduced data in relation to the control LSI 90; 98 is a temperature detector; and 99 is a control circuit for the laser diode 40.

The recorded data output from the control LSI 90 is supplied to the write gate 91. The write gate 91 supplies the recorded data to the write circuit 92 only when the recording control signal that is output from the control LSI 90 instructs a writing operation. The write circuit 92 sends write current to the write coil layer 343 according to the recorded data, and writing is performed onto the magnetic disk by the writing magnetic field generated from the main magnetic pole 3400.

Constant current flows from the constant current circuit 95 to the MR multilayer 332 only when the reproducing control signal that is output from the control LSI 90 instructs a reading operation. The signal reproduced by the MR element 33 is demodulated by the demodulator circuit 97 after being amplified by the amplifier 99, and the obtained reproduction data is output to the control LSI 90.

The laser control circuit 99 receives the laser ON/OFF signal and the operating current control signal that are output from the control LSI 90. When the laser ON/OFF signal is an ON operation instruction, an operating current which meets or exceeds the oscillating threshold value is applied to the laser diode 40. Accordingly, the laser diode 40 illuminates, and laser light propagates the waveguide 35 to couple with the surface plasmon-generator 36 in the surface plasmon mode. Accordingly, the near-field is generated from the end of the surface plasmon-generator 36, is irradiated to the magnetic recording layer of the magnetic disk, and heats the magnetic recording layer. The operating current value at this time is controlled to a value that corresponds to the operating current control signal. The control LSI 90 generates a laser ON/OFF signal according to the timing with the recording and reproducing operations, and considers the temperature and the like of the magnetic recording layer of the magnetic disk measured by the temperature detector 98, and determines a value for the operating current value control signal based on a control table within the ROM 93. Herein, the control table may include not only oscillating threshold values and temperature dependencies for light output—operation current properties, but also data with respect to the relationship between the operating current values and the temperature rise portion of the magnetic recording layer where the thermally-assisted operation is received, as well as data with respect to temperature dependencies for anisotropy magnetic field (coercive force) of the magnetic recording layer. As discussed, by providing laser ON/OFF signals and operating current value control signal system separately from the recording/reproducing operating control signal system, the laser diode 40 that is simply linked to the recording operation can be energized by distributing power thereto. Also, a more diverse power distribution mode can be realized.

Moreover, the circuit configuration of the recording/reproducing and light emitting control circuit 13 is obviously not limited to that illustrated in FIG. 14. Writing operations and reading operations may be specified by signals other than the recording control signal and the reproducing control signal.

A more detailed description will be given of the present invention by giving a specific embodiment regarding the optical waveguide of the present invention described above.

(First Experiment)

Figure 17:
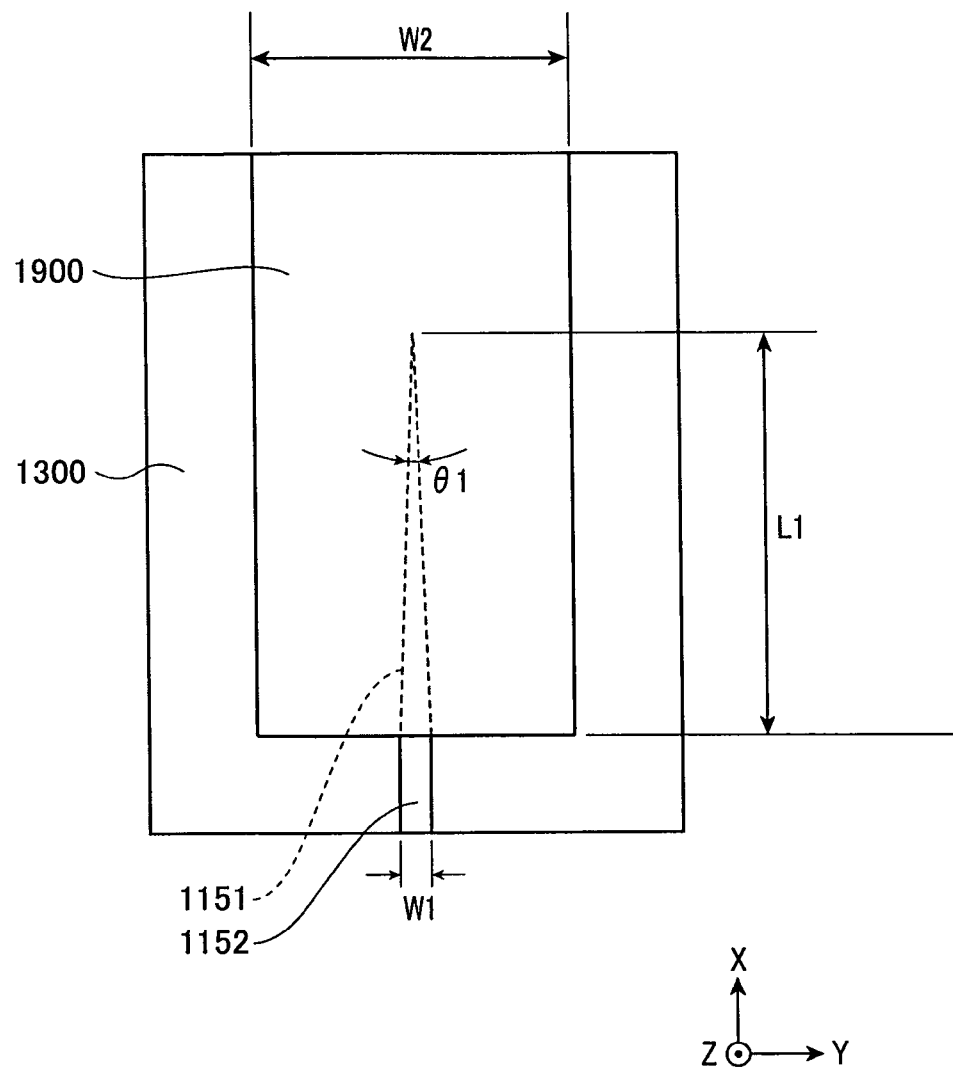
FIG. 17 is an example of the prior art and is a cross-sectional view according to FIG. 2.
Figure 18:
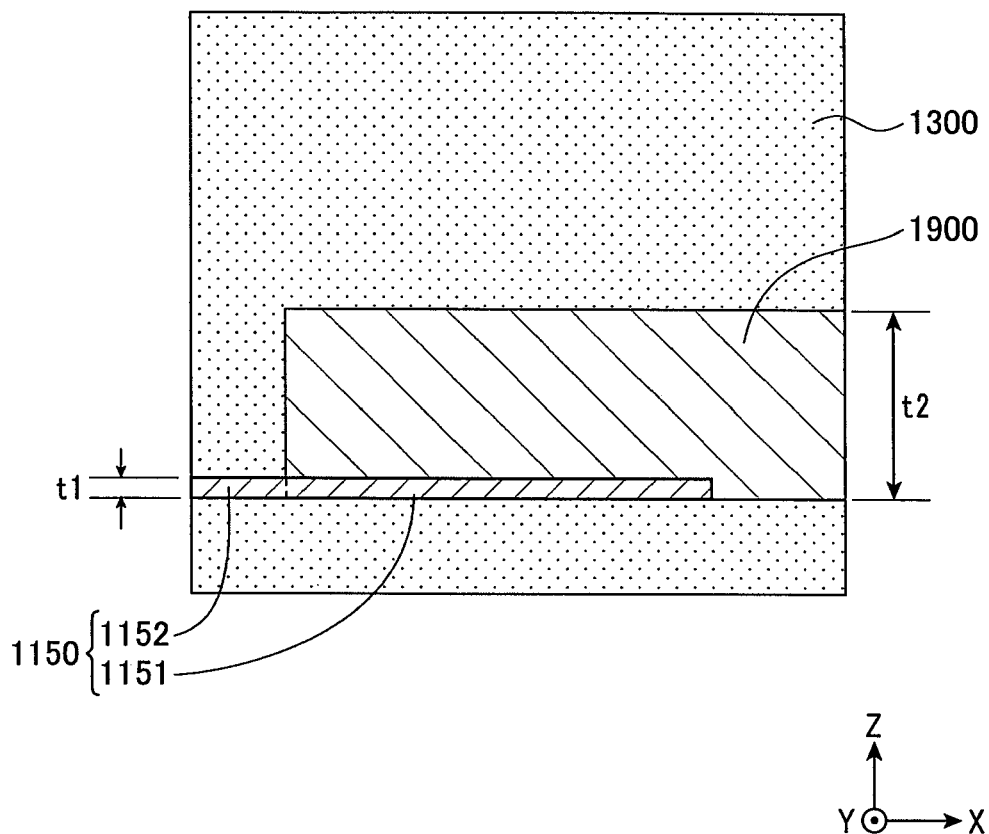
FIG. 18 is an example of the prior art and is a cross-sectional view according to FIG. 3.

In a comparison of a sample of the present invention having a form of the spot size converter of the present invention as illustrated in FIG. 1~FIG. 3 with a comparative sample having an embodiment of a spot size converter of a comparative example as illustrated in FIG. 17 and FIG. 18 (the second core 1900 illustrated in FIG. 17 and FIG. 18 does not has a triangular plate-like taper portion, but has a square column shape), a graph showing the relationship between a taper length (μm) and a propagative efficiency was obtained by simulation experiments. Herein, the taper length is defined with length L2 of the triangular plate-like taper portion of the second core in FIG. 1 and length L1 of the tapered coupling part of the first core. The simulation is under a condition where the length L1=L2.

The details to each specification are given below.
The following illustrates an experimental example analyzed through simulation.
<Simulation Conditions>
Second core material: SiON (refractive index: L 1.7)
Second core total length (X direction length of FIG. 1~3): 50~500 μm
Second core triangular plate-like taper portion length: L2 (parameter, however L2=L1)
Second core width W2: 4 μm
Second core height t2: 2 μm
Second core tapering angle θ2: 0.057~16.26 deg.
First core material: TaOx (refractive index: 2.15)
First core total length (X direction length of FIG. 1~3): 50~500 μm
First core tapered coupling part length: L1 (parameter, however, L1=L2)
First core width W1: 0.5 μm
First core height t1: 0.4 μm
First core spread angle θ1: 0.019~4.9 deg.
Clad material: $Al_2O_3$ (refractive index: 1.65)
Laser light incident side cross-section area: W2×t2 (μm$^2$)
Operation laser light: wavelength 800 nm, TM
FFP (Far-Field-Pattern): Perpendicular θy=31 deg., Parallel θx=9 deg.

The analyzed results from the simulation are shown below in Table 1. In order to visualize the results of Table 1 more easily, the results are shown in the graph in FIG. 15.

Moreover, the data in Table 1 uses the propagative efficiency value of L1=L2=500 μm as a standard value of 1.00 (standardized base), and with this standard value as the basis, the other data is expressed by a standardized numerical value.

TABLE 1

| | Propagative Efficiency (%) | |
| --- | --- | --- |
| Taper Length (μm (On Condition) L1 = L2) | Present Invention Sample (Standardized) | Comparative Sample (Standardized) |
| 50 | 0.21 | 0.21 |
| 100 | 0.60 | 0.39 |
| 150 | 0.80 | 0.55 |
| 200 | 0.92 | 0.66 |
| 300 | 0.99 | 0.81 |
| 400 | 0.999 | 0.90 |
| 500 | 1.00 | 0.98 |

Figure 15:
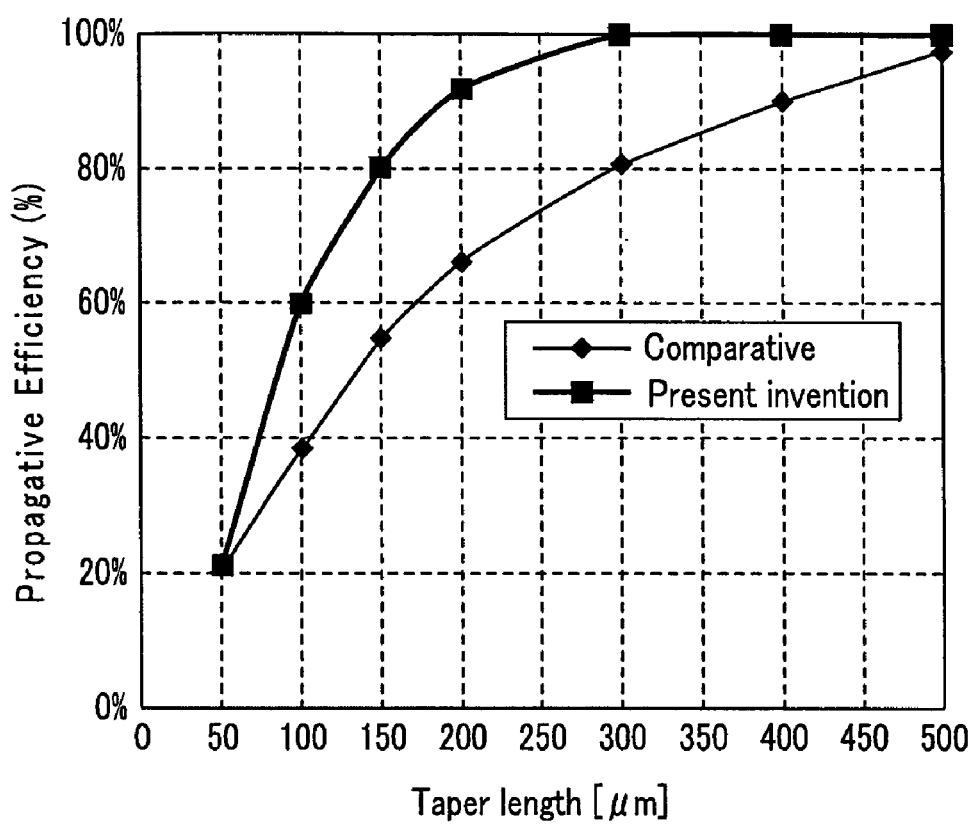
FIG. 15 is a graph illustrating the relationship between the taper length and the propagative efficiency based on the test results of the test example.

From the results expressed in FIG. 15, it can be seen that the sample of the present invention can shorten the length of L1 and L2 that act to taper, while maintaining high propagative efficiency, because the second core also has a taper portion for efficiently tapering the spot size. In other words, it is possible to shorten the required tapering distance for moving light by utilizing the difference in the refractive index, and thus the waveguide length can be shortened.

(Second Experiment)

In the configuration of the sample of the present invention according to the aforementioned first experiment, in other words, with the spot size converter of the present invention as illustrated in FIG. 1 through FIG. 3, a simulation experiment was performed to evaluate how the ratio between the length L2 of the triangular plate-like taper portion of the second core and the length L1 of the tapered coupling part of the first core effects waveguide efficiency.

The basic specification was set in accordance with the aforementioned first experiment. It is noted that L1 was fixed at 230 μm, and the L2/L1 ratio was varied by changing L2 as illustrated in the following Table 2 in relation to the length of L1 of the fixed numerical value, and that the standardized propagative efficiency was determined corresponding to the change ratio.

Figure 16:
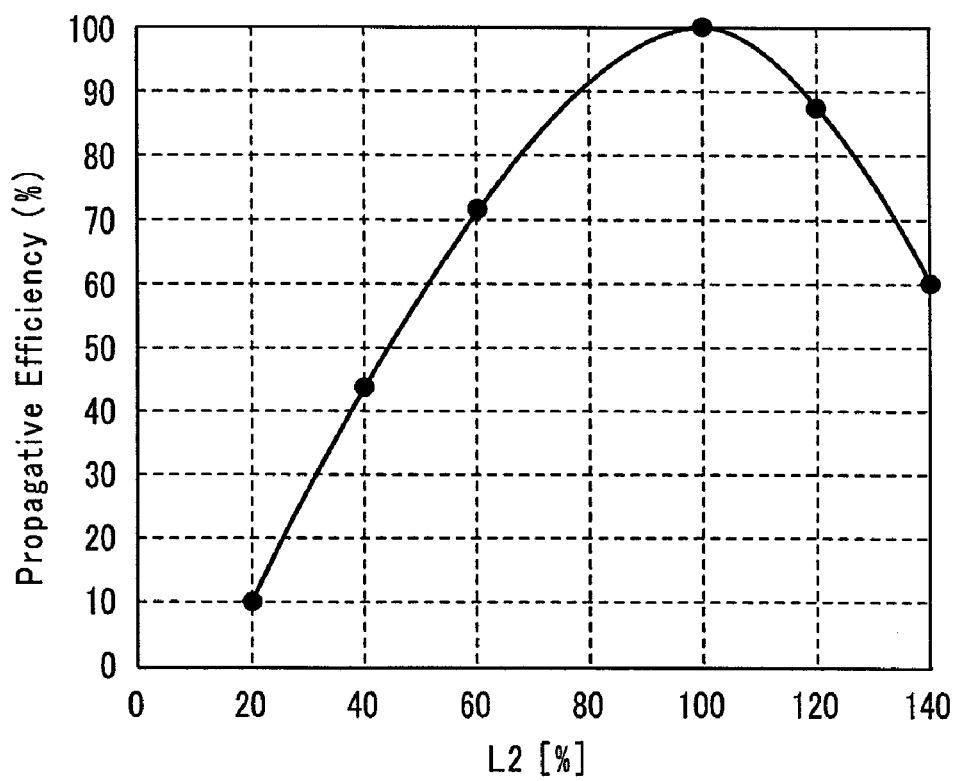
FIG. 16 is a graph illustrating the test results in order to search the optimal relationship of L1 and L2.

In order to easily visualize the results of Table 2, the results are shown in the graph in FIG. 16. Moreover, the data in Table 2 uses the propagative efficiency value where L2/L1=1 is 100% as a standard value (standardized base), and with this standard value as the basis, the other data is expressed by a standardized numerical value.

The results are shown in the following Table 2.

TABLE 2

| L1 (%) | L2 (%) | L2/L1 | Propagative Efficiency (%) (Standardized) |
|---|---|---|---|
| 100 | 140 | 1.4 | 60 |
| 100 | 120 | 1.2 | 87.7 |
| 100 | 100 | 1.0 | 100 |
| 100 | 80 | 0.8 | 92 |
| 100 | 60 | 0.6 | 72 |
| 100 | 40 | 0.4 | 44 |
| 100 | 20 | 0.2 | 10 |

Note that the standardized propagative efficiency is approximately 70% when T1=taper length=230 μm of the comparative example sample (the configuration where the second core 1900 does not have a triangular plate-like taper portion shown in FIG. 17 and FIG. 18) in the first experiment described above, and in relation to this, the value of the L2/L1 ratio of the present invention that obtains a propagative efficiency that exceeded 70%, was found to be between 0.7~1.3, more preferably between 0.85~1.15, and most preferably between 0.95~1.05 (particularly 1.0).

Furthermore, the value of the L2/L1 ratio that obtains a favorable propagative efficiency in such manner was found to express a similar tendency across a range of conditions where θ2/θ1=4.31 to 14.8 (L1=230 μm).

The effects of the present invention can clearly be seen from the foregoing results. In other words, the spot size converter of the present invention combines two cores that provide taper portions, and those tapering angles are mutually aligned, and therefore, the length of the waveguide in the spot size converter can be shortened, and the waveguide itself can be made smaller. Furthermore, the conversion efficiency of the spot size is favorable, even with the reduced size.

What is claimed is:

1. A spot size converter, comprising:
a second core that operates to introduce a light beam and to taper light from the light beam,
a first core that is linked to the second core, and
a clad that surrounds a periphery of a core coupling body formed by linking the first and second cores, wherein
when the refractive index of the second core is $n_{C2}$, the refractive index of the first core is $n_{C1}$, and the refractive index of the clad is $n_{ad}$, the condition of $n_{C1} > n_{C2} > n_{ad}$ is satisfied;
the second core has a rectangular cross-sectional area that gradually decreases as the second core advances internally from the optical incident end surface, and that has a taper portion that is a triangular plate-like part when viewed from a level plane;
the first core has a tapered coupling part that is integrated within the taper portion of the second core, and a waveguide core part that is linked with the tapered coupling part and that propagates primarily in a single mode, and
the tapered coupling part is structured such that its shape viewed from a level plane is a triangular plate-like coupling part, and the level plane in which the rectangular cross-sectional area gradually increases in relation to an advancing direction of the light.

2. The spot size converter of claim 1, wherein
one surface of the triangular plate-like coupling part of the first core contacts the taper portion of the second core;
the other surface of the triangular plate-like coupling part of the first core contacts the clad;
both side surfaces of the triangular plate-like coupling part of the first core contact the taper portion of the second core; and
the periphery of the waveguide core part of the first core is substantially surrounded by the clad.

3. The spot size converter of claim 1, wherein
conditions L2/L1=0.7~1.3, and θ2/θ1=0.005~1847 are satisfied when an effective coupling length of the taper portion of the second core is L2, a tapering angle is θ2, a length of the tapered coupling part of the first core is L1, and a spread angle is θ1.

4. The spot size converter of claim 3, wherein
conditions L2=55~450 μm and θ2=0.026~16.26 deg. are satisfied.

5. The spot size converter of claim 1, wherein
a value of the second core refractive index $n_{C2}$ is within a range of 1.46~2.00, a value of the first core refractive index $n_{C1}$ is within a range of 1.73.4, a value of the clad refractive index $n_{ad}$ is within a range of 1.45~1.80, and a condition of $n_{C1} > n_{C2} > n_{ad}$ is satisfied.

6. The spot size converter of claim 1, wherein
a material of the second core is SiON, a material of the first core is TaOx, and a clad material is $Al_2O_3$.

7. The spot size converter of claim 1, wherein
an end of a width line in a linked area of the tapered coupling part in the first core and the waveguide core part linked to the tapered coupling part exists in a same position that matches with a tapering line of the taper portion of the second core.

8. The spot size converter of claim 1, wherein
an end of a width line in a linked area of the tapered coupling part in the first core and the waveguide core part linked to the tapered coupling part exists inside a tapering line of the taper portion of the second core.

9. The spot size converter of claim 1, wherein
an end of a width line in a linked area of the tapered coupling part in the first core and the waveguide core part linked to the tapered coupling part exists outside a tapering line of the taper portion of the second core.

10. A thermally-assisted magnetic recording head, comprising
a magnetic pole that generates a writing magnetic field from an end surface on an air bearing surface side,
the spot size converter according to claim 1 that propagates light for exciting surface plasmon, and
a plasmon-generator that is a part that couples with the light in a surface plasmon mode.

* * * * *